(12) United States Patent
Mars

(10) Patent No.: US 11,783,824 B1
(45) Date of Patent: Oct. 10, 2023

(54) CROSS-ASSISTANT COMMAND PROCESSING

(71) Applicant: Amazon Technologies, Inc., Seatle, WA (US)

(72) Inventor: Robert John Mars, Los Gatos, CA (US)

(73) Assignee: Amazon Technologies, Inc., Seattle, WA (US)

( * ) Notice: Subject to any disclaimer, the term of this patent is extended or adjusted under 35 U.S.C. 154(b) by 223 days.

(21) Appl. No.: 17/169,078

(22) Filed: Feb. 5, 2021

Related U.S. Application Data

(60) Provisional application No. 63/138,676, filed on Jan. 18, 2021.

(51) Int. Cl.
| | | |
|---|---|---|
| *G10L 15/22* | (2006.01) | |
| *G10L 15/18* | (2013.01) | |
| *G10L 15/30* | (2013.01) | |
| G10L 15/08 | (2006.01) | |

(52) U.S. Cl.
CPC .............. *G10L 15/22* (2013.01); *G10L 15/18* (2013.01); *G10L 15/30* (2013.01); *G10L 2015/088* (2013.01); *G10L 2015/223* (2013.01)

(58) Field of Classification Search
USPC ................. 704/246, 247, 251, 252, 270, 275
See application file for complete search history.

(56) References Cited

U.S. PATENT DOCUMENTS

| | | | | |
|---|---|---|---|---|
| 2018/0233136 A1* | 8/2018 | Torok | ....................... | G10L 15/22 |
| 2018/0233137 A1* | 8/2018 | Torok | ....................... | G06F 3/167 |
| 2019/0019504 A1* | 1/2019 | Hatambeiki | ............ | G06F 3/165 |
| 2019/0066680 A1* | 2/2019 | Woo | ........................ | G10L 15/08 |
| 2019/0362718 A1* | 11/2019 | Bhargava | ................ | G10L 15/22 |

* cited by examiner

*Primary Examiner* — Leonard Saint-Cyr
(74) *Attorney, Agent, or Firm* — PIERCE ATWOOD LLP

(57) ABSTRACT

A speech-processing system may provide access to one or more virtual assistants via an audio-controlled device. A user may leverage a first virtual assistant to translate a natural language command from a first language into a second language, which the device can send to a second virtual assistant for processing. The device may receive a command from a user and send input data representing the command to a first speech-processing system representing the first virtual assistant. The device may receive a response in the form of a first natural language output from the first speech-processing system along with an indication that the first natural language output should be directed to a second speech-processing system representing the second virtual assistant. For example, the command may be in the first language, and the first natural language output may be in the second language, which is understandable by the second speech-processing system.

20 Claims, 14 Drawing Sheets

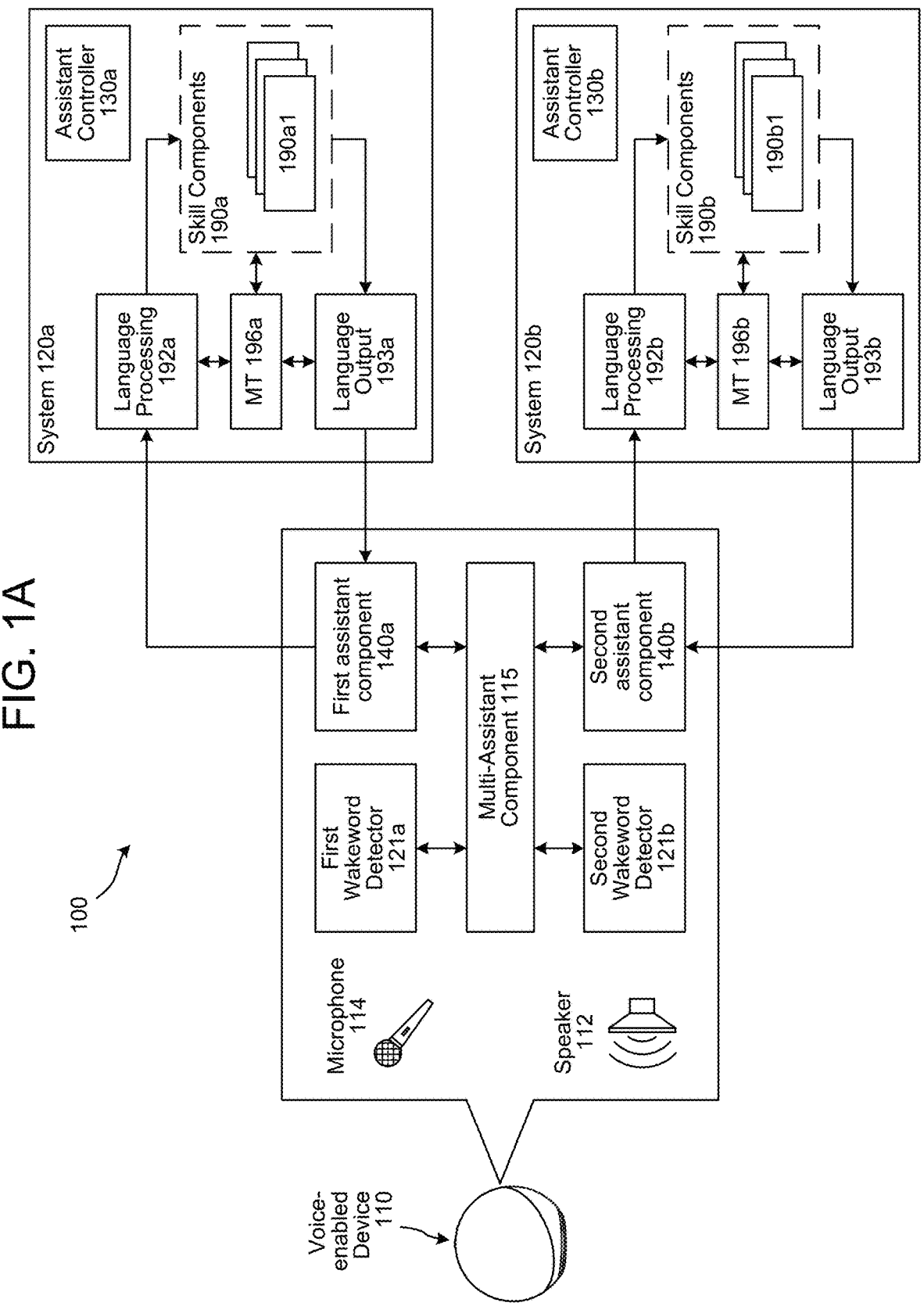

CROSS-ASSISTANT COMMAND PROCESSING

CROSS-REFERENCE TO RELATED APPLICATION DATA

This application claims the benefit of priority of U.S. Provisional Patent Application No. 63/138,676, filed Jan. 18, 2021, and entitled "CROSS-ASSISTANT COMMAND PROCESSING," in the name of Robert John Mars.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech recognition and natural language understanding processing techniques may be referred to collectively or separately herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 1A is a conceptual diagram illustrating components of a virtual assistant system with features for cross-assistant command processing, according to embodiments of the present disclosure;

DETAILED DESCRIPTION

Figure 1B:
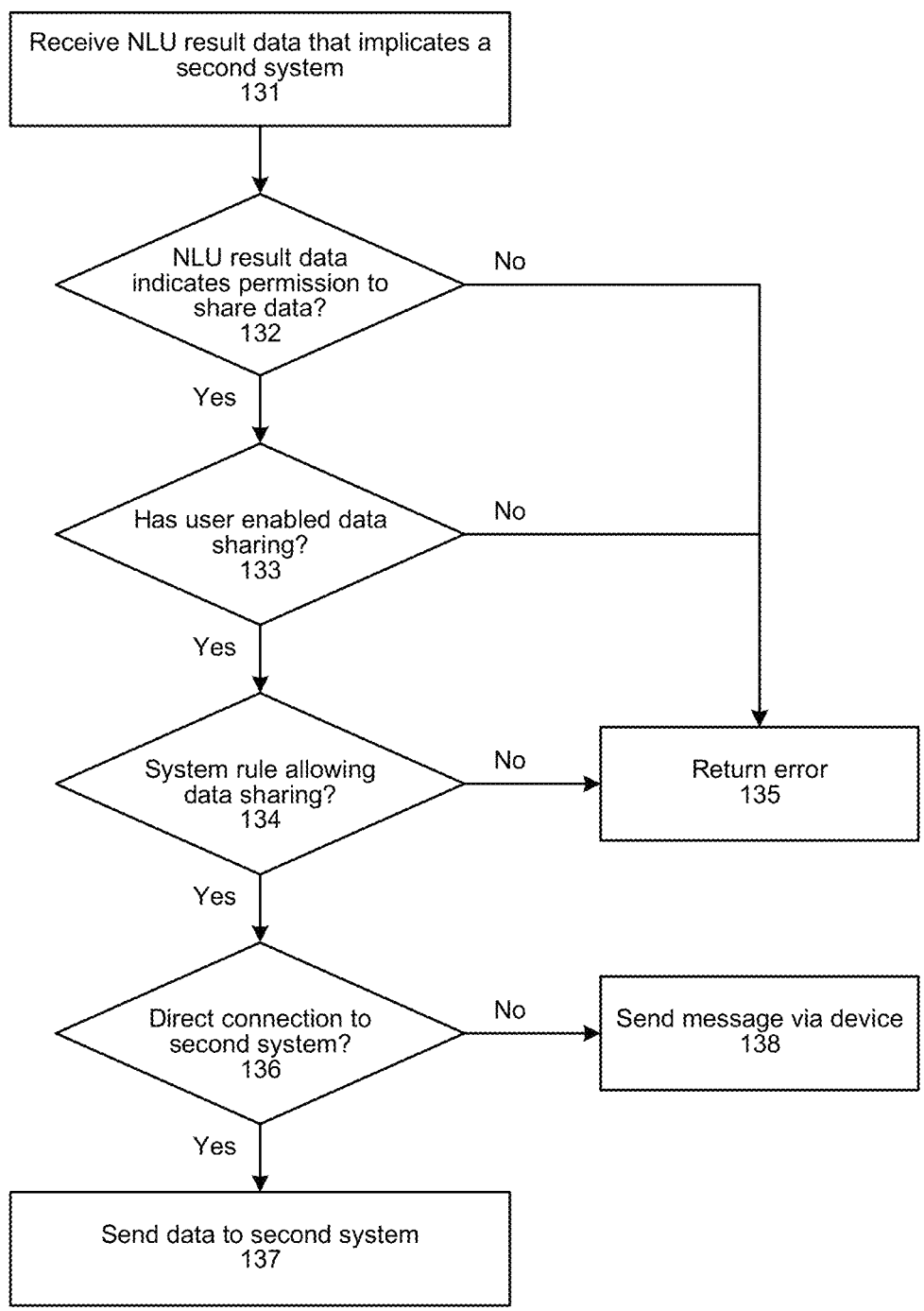
FIG. 1B is a flowchart illustrating example operations of a virtual assistant system performing cross-assistant command processing, according to embodiments of the present disclosure.

Speech processing systems and speech generation systems can be combined with other services to create virtual "assistants" that a user can interact with using natural language inputs such as speech, text inputs, or the like. The assistant can leverage different computerized voice-enabled technologies. Automatic speech recognition (ASR) is a field of computer science, artificial intelligence, and linguistics concerned with transforming audio data associated with speech into text or other type of word representative data of that speech. Similarly, natural language understanding (NLU) is a field of computer science, artificial intelligence, and linguistics concerned with enabling computers to derive meaning from text or other natural language meaning representation data. ASR and NLU are often used together as part of a speech processing system, sometimes referred to as a spoken language understanding (SLU) system. Text-to-speech (TTS) is a field of computer science concerning transforming textual and/or other meaning representation data into audio data that is synthesized to resemble human speech. ASR, NLU, and TTS may be used together to act as a virtual assistant that can respond to spoken commands and respond with synthesized speech. For example, an audio-controlled user device and/or one or more speech-processing systems may be configured to receive human speech and detect a wakeword used to activate the device and/or other natural language input. The device and/or system may determine a command represented by the user input, and use TTS and/or other system command to provide a response (e.g., in the form of synthesized speech, command to send audio to a different device/system component, etc.).

Some audio-controlled devices can provide access to more than one speech-processing system, where each speech-processing system may provide services associated with a different virtual assistant. In such multi-assistant systems, one or more of the speech-processing system may be associated with its own wakeword for invoking the speech-processing system, as well as observable characteristics such as voice characteristics and other audible or visual indicators that allow a user to identify which speech-processing system the user is interacting with. While speech-processing systems do not need to interact with each other, in some cases, the user may use a first speech-processing system to communicate with a second speech-processing system. This may be useful when, for example, the first speech-processing system can translate a verbal command from a user in a first language to a second language understandable by the second speech-processing system. For example a user can speak or type in English to the first system, which translate it the input into French, generates audio data representing the input in French, and sends the second speech-processing system the audio data in French.

In a more detailed example operation, the user may say to the audio-controlled device: "Alexa, ask Mandy to place my order with Marketplace Asia." "Alexa" may represent a wakeword corresponding to a first speech-processing system, and "Mandy" may represent a wakeword corresponding to a second speech-processing system. The device may send data representing this utterance to the first speech-processing system. The first speech processing system may determine that the utterance represents a request to send a command to the second speech-processing system; for example, by performing natural language processing in conjunction with detecting the wakeword associated with the second speech-processing system. The first speech-processing system may determine that while the utterance was in a first natural language (e.g., English), the second speech-processing system processes commands in a second natural language (e.g., Mandarin). Accordingly, the first speech-processing system may translate the command into Mandarin, and return to the device a natural language representation of the command, translated into Mandarin, along with an indication that the device should send the first natural language output to the second speech-processing system. The second speech-processing system may process the command represented in the first natural language output and perform one or more actions. The actions may include returning a response in the form of a second natural language output, or the performance of a requested task (e.g., making a purchase, playing music, etc.). In some cases, the response from the second speech-processing system may be in the second natural language. The device may thus send the second natural language output to the first speech-processing system with an indication that the first speech-processing system is to translate the response in to the first natural language, and return a third natural language output for output by the device as synthesized speech.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

FIG. 1A is a conceptual diagram illustrating components of a virtual assistant system 100 with features for cross-assistant command processing, according to embodiments of the present disclosure. The virtual assistant system 100 may include an audio-enabled device 110, a first natural language processing system 120a (abbreviated "first system 120a"), and a second natural language processing system 120b (abbreviated "second system 120b"). The first system 120a and the second system 120b may be referred to collectively as "systems 120." Although FIG. 1A illustrates the first system 120a and the second system 120b as having similar components in a similar arrangement, the components, functions, and/or architectures of the first system 120a and the second system 120b may differ. In addition, some or all of the components and/or functions of one or both of the first system 120a and/or the second system 120b may reside on, or be performed by, the device 110. Other possible arrangements of the components and functions of the device 110 and the systems 120 are described in additional detail below with reference to FIGS. 4 and 5. The device 110 may receive audio corresponding to a spoken natural language input originating from the user 5. The device 110 may process audio following detection of a wakeword. A wakeword may be a word or phrase that, when detected, may cause a device 110 to invoke a speech-processing system 120 for processing audio data that accompanies or includes the wakeword. The device 110 may generate audio data corresponding to the audio, and may send the audio data to the first system 120a and/or the second system 120b. The device 110 may send the audio data to the systems 120 via one or more applications installed on the device 110. An example of such an application is the Amazon Alexa application that may be installed on a smart phone, tablet, or the like. In some implementations, the device 110 may receive text data corresponding to a natural language input originating from the user 5, and send the text data to one of the systems 120. The device 110 may receive output data from the system 120, and generate a synthesized speech output and/or perform some action. The device 110 may include a camera for capturing image and/or video data for processing by the systems 120. Examples of various devices 110 are further illustrated in FIG. 13. The systems 120 may be remote system such as a group of computing components located geographically remote from device 110 but accessible via network 199 (for example, servers accessible via the internet). The systems 120 may also include a remote system that is physically separate from device 110 but located geographically close to device 110 and accessible via network 199 (for example a home server located in a same residence as device 110). The systems 120 may also include some combination thereof, for example where certain components/operations are performed via a home server(s) and others are performed via a geographically remote server(s). Although the figures and discussion of the present disclosure illustrate certain steps in a particular order, the steps described may be performed in a different order (as well as certain steps removed or added) without departing from the present disclosure.

The device 110 may include a microphone 114 for receiving audio and a speaker 112 for emitting audio. The device 110 may include one or more wakeword detectors 121 such as the first wakeword detector 121a and the second wakeword detector 121b. In some implementations, a wakeword detector 121 may be embedded in a processor chip; for example, a digital signal processor (DSP). In some implementations, a wakeword detector 121 may be an application-driven software component. In the example system 100 shown in FIG. 1A, the first wakeword detector 121a may detect one or more wakewords associated with the first system 120a, and the second wakeword detector 121b may detect one or more wakewords associated with the second system 120b. In some implementations, the device 110 may include a wakeword detector 121 may detect wakewords for more than one system 120. In some implementations, the device 110 may include a dedicated wakeword detector 121 for a system 120.

The device may include one or more assistant components 140 including the first assistant component 140a and the second assistant component 140b. The assistant component(s) 140 may interface with one or more of the systems 120. In the example system 100 shown in FIG. 1A, the first assistant component 140a communicates with the first system 120a, and the second assistant component 140b communicates with the second system 120b. In some implementations, a single assistant component 140 may handle communications with more than one system 120. The device 110 may have a dedicated assistant component 140 for a system 120, or a single assistant component 140 communicating with all systems 120. The device may include a multi-assistant component 115 for managing multi-assistant and cross-assistant operations of the device 110 as described herein. Additional components of the device 110 are described in additional detail below with reference to FIG. 11.

The systems 120 may include an assistant controller 130, such as the first assistant controller 130a in the first system 120a, and the second assistant controller 130b in the second system 120b. The assistant controllers 130 may make certain determinations regarding how to handle cross-assistant requests received from the device. For example, the assistant controller 130 may determine based on NLU result data from a language processing component 192, that audio data or other input data received from the device 110 represents a request to send data to another system 120; for example, following a language translation. The assistant controller 130 may determine whether user settings and/or system policies allow or prevent such data sharing. The assistant controller 130 may determine how to share data with the second system; for example, by returning second audio data to the device 110 along with an indication that the second audio data is to be sent to the second system 120b. Operation of the assistant controller 130 is described in additional detail below with reference to FIG. 1B.

The systems 120 may include various components for processing natural language commands. The system 120 may include a language processing component 192 for performing operations related to understanding natural language such as ASR, NLU, entity resolution, etc. The system 120 may include a language output component 193 for performing operations related to generating a natural language output, such as TTS. The system 120 may include one or more skill components 190. The skill components 190 may perform various operations related to executing commands such as online shopping, streaming media, controlling smart-home appliances, and the like. The system 120 may include a machine translation (MT) component such as the MT engine 196 shown in FIG. 1A, which may perform operations related to translating a natural language input in a first language into natural language output in a second language. The MT engine 196 may receive input segments (e.g., text data, which may include formatting and/or markup tags such as is used in HTML) and return a translated segment (e.g., translated text data). The MT engine 196 is described in additional detail below with reference to FIG. 9. The MT engine 196 may also be included as part of a MT component that is separate from system 120a and/or system 120b.

A user of the device 110 may leverage one of the systems 120 for assistance in sending commands to the other system 120. For example, the user may send a natural language command to the first system 120a for translation into a language used by the second system 120b. The user may speak or type the command into the device 110. The command may be, for example, "Alexa, ask Mandy to place my order with Marketplace Asia." The first wakeword detector 121a may detect the wakeword "Alexa," which may correspond to the first system 120a. The first wakeword detector 121a may notify the multi-assistant component 115 and/or the first assistant component 140a of the detection. The multi-assistant component 115 may permit the first assistant component 140a to initiate a dialog with the system 120a. A dialog may be managed and/or tracked by a dialog manager component 572. The dialog manager 572 is described below with reference to FIG. 5.

In this example, the command includes the wakeword "Mandy" corresponding to the system 120b. The second wakeword detector 121b may detect this wakeword and notify the multi-assistant component 115 and/or the second assistant component 140b. Because the multi-assistant component 115 has already permitted an initiation of the dialog based on the current command, the multi-assistant component 115 may prevent the second assistant component 140b from initiating a second dialog based on detection of "Mandy." The multi-assistant component 115 may, however, send metadata to the first assistant component 140a and/or the first system 120a regarding the wakeword "Mandy." For example, the multi-assistant component 115 may execute commands in Mandarin but not English. The multi-assistant component 115 may thus send metadata to the first system 120a that "Mandy" is a wakeword corresponding to the second system 120b, and that the second system 120b accepts commands in Mandarin.

The first system 120a may receive the input data representing the command and the metadata representing characteristics of the second system 120b. The metadata may indicate, for example, that the second system 120b accepts natural language in a certain language or languages. A language processing component 192a of the first system 120a may process the input data and determine that the input represents a request to translate the message into another language for sending to the second system 120b. The first system 120a may translate the command into a translated command using, for example, the MT engine 196a. The MT engine 196a of the first system 120a may be able to translate English-language input data into one or more other natural languages; e.g., Mandarin, Spanish, French, etc. In some implementations, the MT engine 196a may be able to translate input data into English from one or more other natural languages. The MT engine 196a and its operations are described in additional detail below with reference to FIG. 9. A language output component 193a of the first system 120a may convert the translated command into a natural langue output in the form of text data and/or audio data. The first system 120a may return the audio data representing the translated command back to the multi-assistant component 115. The multi-assistant component 115 may recognize that the data is to be sent to the second system 120b via the second assistant component 140b. The multi-assistant component 115 may do so based on state information regarding the dialog initiated by the first assistant component 140a when the command was initially received, and/or based on metadata—for example, a directive—received from the first system 120a. In some implementations, the data may include a representation of a wakeword or some other reference associated with and/or identifying the second system 120b. In any event, the multi-assistant component 115 may send the audio data to the second assistant component 140b, which may in turn send the audio data to the second system 120b. The second system 120b may receive the audio data and, using the language processing component 192b, identify the command to be executed. The second system 120b may execute the command using, for example, one of the skill components 190.

In some implementations, the device 110 may, when sending the data to the second system 120b, include metadata regarding the dialog. The second system 120b may select a language for response data based on dialog metadata specifying a language of the dialog; that is, a language of the input data as identified by the first system 120a. If the second system 120b has the capability, it may generate response data in the language of the dialog, which may be different from the language of the command sent to the second system 120b; for example, if the command sent to the second system 120b is in Mandarin but metadata from the device 110 indicates that the dialog is in English. If the second system 120b has the capability to respond in English, the second system 120b may generate response data in English. The second system 120b may include an MT engine 196b for performing such translations. The MT engine 196b of the second system 120b may be able to translate Mandarin response data into one or more other natural languages; e.g., English, Spanish, French, etc. A language output component 193b of the second system 120b may convert the English response data into a natural language output such as text data or audio data representing written and/or spoken English. The language output component 193b may send the audio data to the device 110. The second system 120b may include metadata indicating the language of the audio data. The multi-assistant component 115 may determine that the language of the audio data response is in the same language as that of the dialog. If so, the multi-assistant component 115 may send the audio data to an audio driver of the device 110 for output via the speaker 112 as synthesized speech.

In some implementations, however, the second system 120b may return data in the same language as the command as the second system 120b received. The multi-assistant component 115, upon detecting that the data response is in, for example, Mandarin when the dialog is in English, may determine that the data should be sent back to the first system 120a for translation back into English. The first assistant component 140a may send the audio data to the first system 120a for translation in a manner similar to the original request for translation. The multi-assistant component 115 may receive the translated response from the first system 120a, and send it to the audio driver for output as synthesized speech.

Inputs and outputs from the device 110 need not be in (or represent) spoken language. In some implementations, the user may be able to input natural language inputs via text, braille, American Sign Language (ASL), etc. The device 110 may send these inputs to the first system 120a for conversion and/or translation into messages that the device 110 may send to the second system 120b for additional processing.

FIG. 1B is a flowchart illustrating example operations of a virtual assistant system 100 performing cross-assistant command processing, according to embodiments of the present disclosure. A first system 120a may receive a request from a device to send data to a second system 120b; for example, in the form of a natural language command to be executed by the second system 120b. An assistant controller 130 of the first system 120a may make various determinations regarding whether and how it may share data with the second system 120b. If a user setting or system policy prevents such sharing, the first system 120a may return an error message. If settings/policies allow sharing, the assistant controller 130 may determine how data may be shared with the second system 120b; for example, either directly via a handoff involving communication between the first system 120a and the second system 120b, or indirectly by sending a response to the device 110 for sending to the second system 120b.

The first system 120a may receive a natural language input from the device 110. A language processing component 192 of the first system 120a may process the input data to determine NLU results data including, for example, an indication that the input data represents a request to send data to a second system 120b. The input data may, in some cases, additionally include a wakeword corresponding to second system 120b. The assistant controller 130a may, at a step 131, receive the NLU result data from a language processing component 192. The assistant controller 130a may make one or more determinations regarding how to handle the request. The assistant controller 130a may, at a decision block 132, determine whether the NLU result data indicates an explicit or implicit user permission to share data with the second system 120b. If the assistant controller 130a determines that the NLU result data does not indicate a wish to send data to the second system 120b ("no" at 132)—for example, because the command is in the form of a question: "Alexa, does Mandy have anything in my shopping cart?"—the assistant controller 130a may, at a step 135, return an error. The error may include a message to the user that the first system 120a cannot process the request; for example, because the request does not indicate permission to share data with the second system 120b. If the assistant controller 130a determines that the NLU result data indicates that the user wishes to send data to the second system 120b ("yes" at 132), the assistant controller 130a may proceed to the next determination. For example, the input data may represent a natural language command such as: "Alexa, ask Mandy to play my order with Marketplace Asia," where "ask Mandy" may be interpreted as a request to send a command to the second system 120b.

In some implementations, the assistant controller 130a may determine, at a decision block 133, whether data sharing is enabled for the user. The first system 120a may store, for example in a profile storage, a setting relating to data sharing. Sharing may be disabled by default, and enabled only via an explicit user command or toggling the setting, for example, using a menu of profile settings displayed by the device 110. The assistant controller 130a may receive a profile identifier associated with the NLU data, and use the profile identifier to retrieve profile data from a profile storage. The assistant controller 130a may determine, based on the profile data, whether sharing is enabled for the particular user generally or with respect to a particular other system 120. If the assistant controller 130a determines that sharing is not enabled ("no" at 133), the system 120a may, at the step 135, return an error to the device 110. If the assistant controller 130a determines that data sharing is enabled ("yes" at 133), the system 120a may proceed to the next determination.

In some implementations, the assistant controller 130a may perform other determinations, using the profile identifier, based on user settings and/or system policies. For example, the user settings may indicate a default language for dialogs. The user settings may indicate that all data sent from one system 120 to another system 120 via the device 110 should be output by the device 110 as synthesized speech (or, alternatively, not audibly output). The first system 120a may thus include an indication such as a directive or metadata to cause the device 110 to audibly output data sent to the second system 120b via the device 110 for the user to hear.

In some implementations, the assistant controller 130a may determine, at a decision block 134, whether there is a system rule that allows or prevents data sharing with the second system 120b. The first system 120a may have one rule for data sharing with any other system 120, or individual rules for respective other systems 120. In some implementations, the first system 120a may have a default rule regarding data sharing that may be superseded by a rule for a particular system 120. If the assistant controller 130a determines that a rule prevents data sharing ("no" at 134), the system 120a may, at the step 135, return an error to the device 110. If the assistant controller 130a determines that sharing data with the second system 120*b* is allowed ("yes" at 134), the system 120*a* may proceed to the next determination.

The assistant controller 130*a* may determine, at a decision block 136, what channels it has available to share data with the second system 120*b*. A system 120 may communicate with other systems by a variety of mechanisms. For example, in some implementations, the second system 120*b* may have an application programming interface (API) that the first system 120*a* may use to send data directly. In some implementations, the first system 120*a* may communicate with one or more skills or skill systems also used by the second system 120*b*. If the request involves a command that can be processed by a skill system used by both systems 120, the first system 120*a* may send the command to the skill system with an indication that the skill system should respond to the command as though it were issued by the second system 120*b*. If the assistant controller 130*a* determines that the first system 120*a* has direct channel for communication with the second system 120*b* ("yes" at 136), the system 120*a* may, at a step 138, send the command to the second system 120*b*. If, however the assistant controller 130*a* determines that it does not have a direct connection to the second system 120*b* ("no" at 136), the system 120*a* may send, at a step 137, the command to the device 110 along with an indication, such as a directive, indicating that the command is to be sent to the second system 120*b* for processing.

Figure 2:
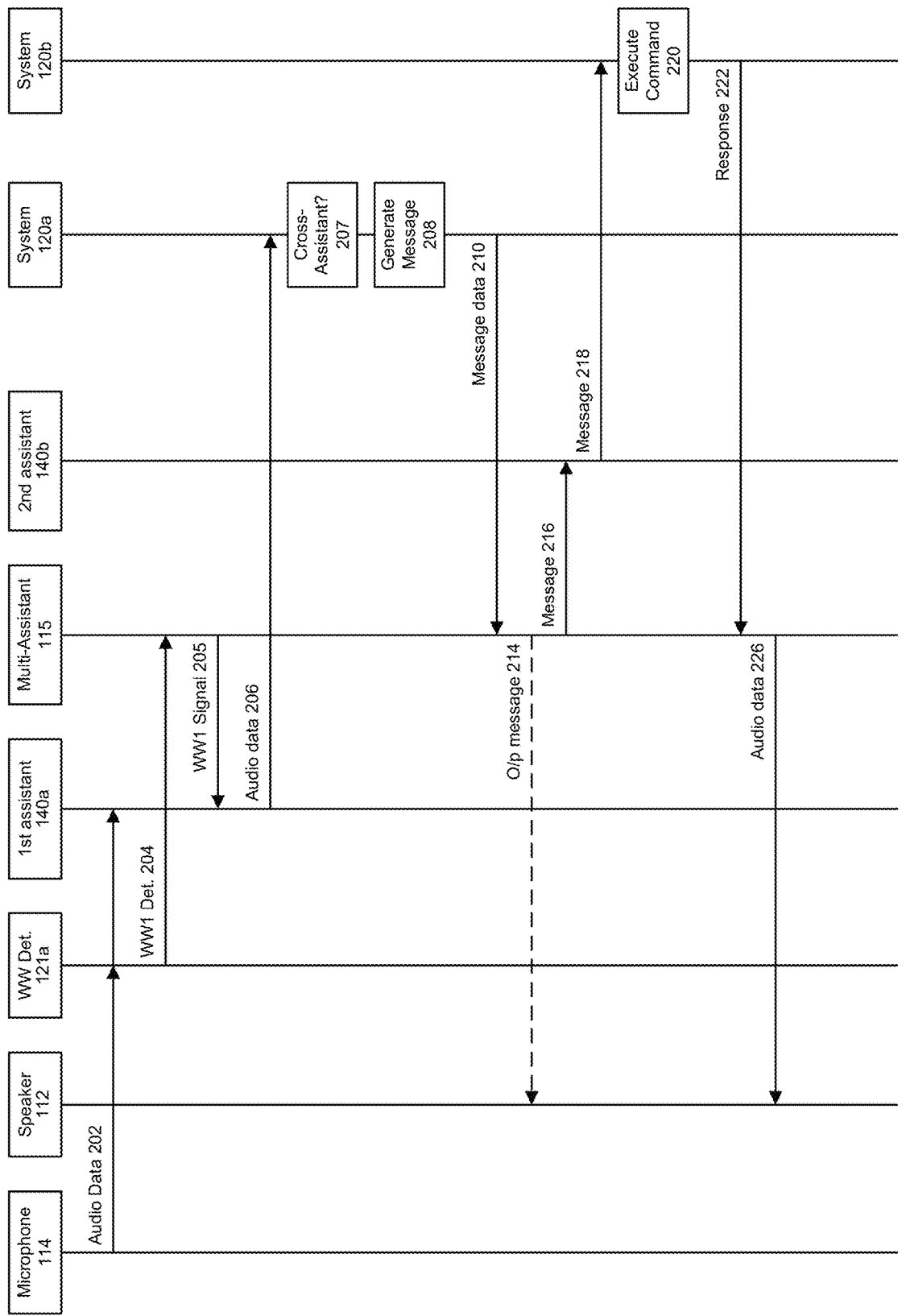
FIG. 2 is a signal flow diagram illustrating first example operations for cross-assistant command processing, according to embodiments of the present disclosure.

FIG. 2 is a signal flow diagram illustrating first example operations for cross-assistant command processing, according to embodiments of the present disclosure. FIG. 2 illustrates operations in which a user can leverage the first system 120*a* to send a command, message, or other data to the second system 120*b*. FIG. 2 illustrates operations between at microphone 114, a speaker 112, a first wakeword detector 121*a*, a first assistant component 140*a*, a multi-assistant component 115, and a second assistant component 140*b* of a device 110, and the first system 120*a* and the second system 120*b*.

The microphone 114 may receive an audio signal and send (202) audio data to the first wakeword detector 121*a*. The audio data may represent, for example, a natural language command such as: "Alexa, ask Mandy to play my order with Marketplace Asia." The 121*a* may detect the wakeword "Alexa," and determine that it corresponds with the first system 120*a* and the first assistant component 140*a*. The first wakeword detector 121*a* may notify (204) the multi-assistant component 115 that the wakeword was detected in the input. The multi-assistant component 115 may signal (205) the first assistant component 140*a* that the first assistant component 140*a* may send data representing the command to the first system 120*a*. The first assistant component 140*a* may send (206) audio data representing the command to the first system 120*a*. In some implementations, the device 110 may receive input data in other formats, such as typed or scanned text, braille, or American Sign Language (ASL) (for example as detected by processing image data and/or sensor data representing a user communicating in ASL). The device 110 may determine that the input data is to be processed by the first system 120*a* based on other indications, such as a button press or because the first system 120*a* represents a default system 120 for executing commands from the device 110.

The first system 120*a* may make (207) one or more determinations regarding cross-assistant data sharing. For example, the first system 120*a* may determine that the audio data represents a request to send data to the second system 120*b*. The first system 120*a* may determine whether a user setting and/or system rule allows or restricts data sharing with the second system. The first system 120*a* may additionally determine whether it is configured to send data directly to the second system 120*b*; for example, whether the first system 120*a* has access to a direct channel such as an application programming interface (API) of the second system 120*b* for sending data directly to the second system 120*b*. In the example operations shown in FIG. 2, the first system 120*a* may determine that the audio data represents a request to send data to the second system 120*b*, that no rule or setting prevents such sharing, and that the first system 120*a* has no direction connection to the second system 120*b*. Accordingly, the first system 120*a* may send data to the second system 120*b* via the device 110.

The first system 120*a* may process the audio data (and/or other input data) and determine that it represents a request to generate a message to the second system 120*b*. The first system 120*a* may generate (208) the message and return (210) it to the multi-assistant component 115 in the form of text data and/or audio data. The message may include or be accompanied by metadata such as a directive that may indicate to the multi-assistant component 115 that the message is to be sent to the second system 120*b*. In some implementations, the device 110 may audibly output the message via the speaker 112 such that the user can hear the message as it is sent to the second system 120*b*. Thus, the multi-assistant component 115 may send (214) audio data to the speaker 112 for output as synthesized speech. The multi-assistant component 115 may, in conjunction with sending the audio data to the speaker 112, temporarily deactivate wakeword detection. The multi-assistant component 115 may do so by, for a limited time, blocking audio data from the microphone 114 from reaching the wakeword detector 121, by blocking an output of the wakeword detector 121, and/or by refusing a request by an assistant-specific component 140 to initiate a dialog, etc. The multi-assistant component 115 may, based on the metadata associated with the message and/or knowledge of the state of the dialog of which the message is a part, determine that the message should be sent to the second system 120*b*. In some implementations, the message data may include a representation of a wakeword or other reference corresponding to and/or identifying the second system 120*b*. The multi-assistant component 115 or a secondary wakeword detector 121 may detect the representation of the wakeword and determine that the message is to be sent to the second system 120*b*. In any case, the multi-assistant component 115 may send (216) the message to the second assistant component 140*b*. The second assistant component 140*b* may then send (218) the message to the second system 120*b*.

The second system 120*b* may receive the message and determine that the message represents a command to be executed. The second system 120*b* may execute (220) the command, and return (222) response data to the multi-assistant component 115. (In some cases, however, the second system 120*b* may execute the command without returning any response; for example, if the command relates to streaming media or controlling a smart-home appliance.) The multi-assistant component 115 may determine, based on the state of the dialog, that the response should be output. Accordingly, the multi-assistant component 115 can send (226) the response audio data to the speaker 112 for output as synthesized speech.

Figure 3:
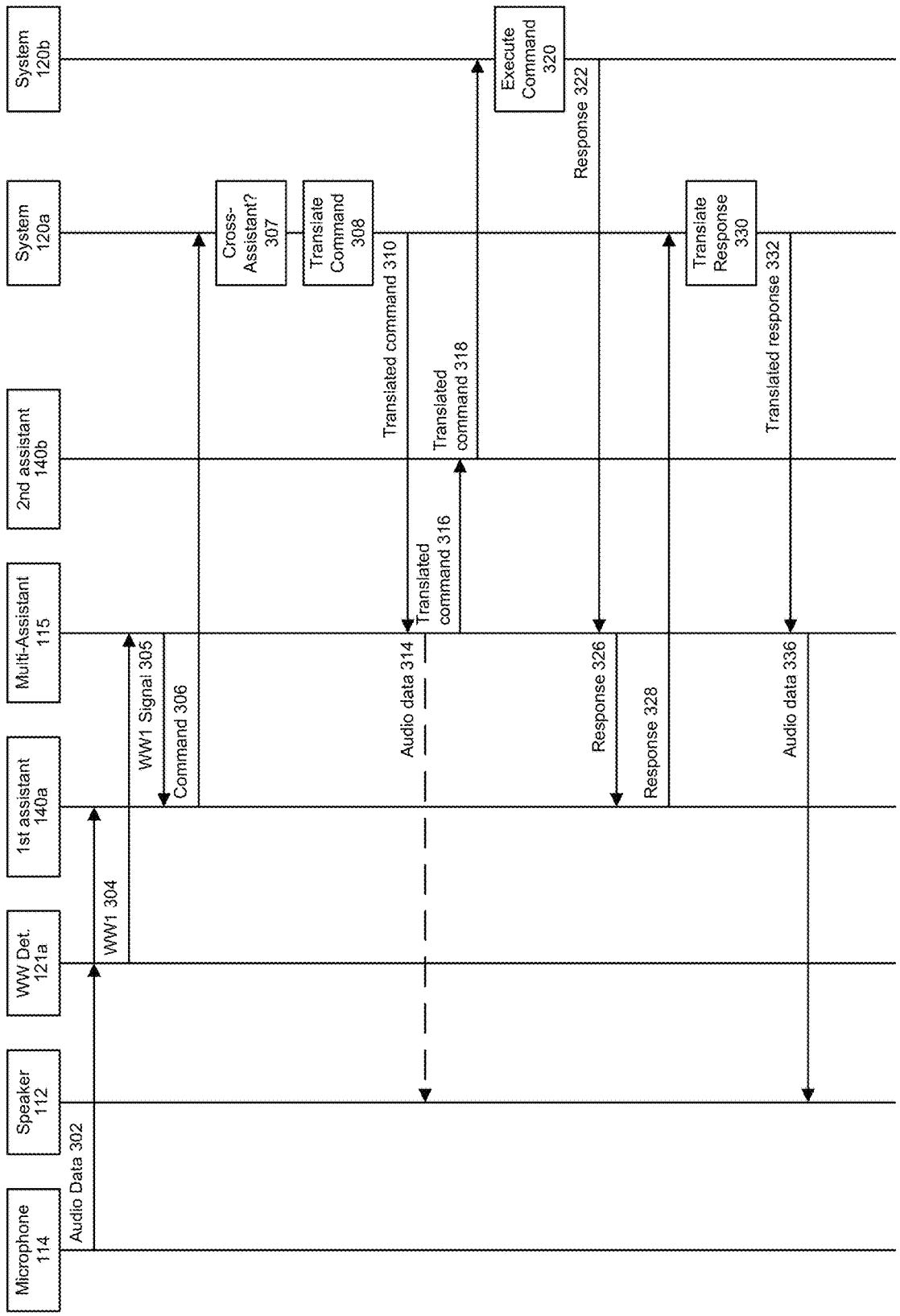
FIG. 3 is a signal flow diagram illustrating second example operations for cross-assistant command processing, according to embodiments of the present disclosure.

FIG. 3 is a signal flow diagram illustrating second example operations for cross-assistant command processing, according to embodiments of the present disclosure. FIG. 3 illustrates operations in which a user can leverage the first system 120a to translate a natural language command for execution by the second system 120b. FIG. 3 illustrates operations between at microphone 114, a speaker 112, a first wakeword detector 121a, a first assistant component 140a, a multi-assistant component 115, and a second assistant component 140b of a device 110, and the first system 120a and the second system 120b.

The microphone 114 may receive an audio signal and send (302) audio data to the first wakeword detector 121a. The audio data may represent, for example, a natural language command such as: "Alexa, ask Mandy to play my order with Marketplace Asia." The first wakeword detector 121a may detect the wakeword "Alexa," and determine that it corresponds with the first system 120a and the first assistant component 140a. The first wakeword detector 121a may notify (304) the multi-assistant component 115 that the wakeword was detected in the input. The multi-assistant component 115 may signal (305) the first assistant component 140a that the first assistant component 140a may send data representing the command to the first system 120a. The first assistant component 140a may send (306) audio data representing the command to the first system 120a. The first system 120a may process the audio data and determine that it represents a command expressed in a first natural language and a request to translate the command to a second natural language.

The first system 120a may make (307) one or more determinations regarding cross-assistant data sharing. For example, the first system 120a may determine that the audio data represents a request to translate the command and send it to the second system 120b. The first system 120a may determine whether a user setting and/or system rule allows or restricts data sharing with the second system. The first system 120a may additionally determine whether it is configured to send data directly to the second system 120b; for example, whether the first system 120a has access to a direct channel such as an application programming interface (API) of the second system 120b for sending data directly to the second system 120b. In the example operations shown in FIG. 3, the first system 120a may determine that the audio data represents a request to send a translated command to the second system 120b, that no rule or setting prevents such sharing, and that the first system 120a has no direction connection to the second system 120b. Accordingly, the first system 120a may send the translated command to the second system 120b via the device 110.

The first system 120a may translate (308) the command into the second language. The first system 120a may translate the command using, for example, the MT engine 196. The first system 120a may send input segments (e.g., text data in the first language) to the MT engine 196, and the MT engine 196 may return a translated segment (e.g., translated text data in the second language). The first system 120a may return (310) the translated command to the multi-assistant component 115. The translated command may include or be accompanied by metadata such as a directive that may indicate to the multi-assistant component 115 that the message is to be sent to the second system 120b. In some implementations, the first system 120a may return the translated command as text data. In some implementations, the first system 120a may perform TTS on the translate data to generate output audio data representing the translated command. In some implementations, the device 110 may audibly output the translated command via the speaker 112 such that the user can hear the translated command as it is sent to the second system 120b. Thus, the multi-assistant component 115 may send (314) audio data to the speaker 112 for output as synthesized speech. The multi-assistant component 115 may, in conjunction with sending the audio data to the speaker 112, temporarily deactivate wakeword detection. The multi-assistant component 115 may do so by, for a limited time, blocking audio data from the microphone 114 from reaching the wakeword detector 121, by blocking an output of the wakeword detector 121, and/or by refusing a request by an assistant-specific component 140 to initiate a dialog, etc.

The multi-assistant component 115 may determine that the translated command should be sent to the second system 120b. For example, the multi-assistant component 115 may receive metadata from the second system 120b indicating that the device 110 should send the translated command to the second system 120b. In some implementations, a secondary wakeword detector 121 of the device 110 may detect a representation of a wakeword or some other reference associated with and/or identifying the second system 120b in the translated command and notify the multi-assistant component 115 and/or the second assistant component 140b that the translated command should be sent to the second system 120b. Thus, the multi-assistant component 115 may send (316) the translated command to the second assistant component 140b. The second assistant component 140b may then send (318) the translated command to the second system 120b.

The second system 120b may receive the translated command and identify the command to be executed. The second system 120b may execute (320) the command, and return (322) response data to the multi-assistant component 115. The response data may include, for example, output audio data and/or text data representing a natural language response. The multi-assistant component 115 may determine, based on the state of the dialog, that the response is in a language other than that of the dialog. For example, the multi-assistant component 115 may receive metadata from the second system 120b that the translated command is in the second language. The multi-assistant component 115 may know that the translated command is part of a dialog conducted in the first language. Thus, rather than output the translated command in the second language, the multi-assistant component 115 may send (326) the response to the first assistant component 140a, which may in turn send (328) the response to the first system 120a. The first system 120a may translate (330) the response, and return (332) the translated response to the multi-assistant component 115. The multi-assistant component 115 may determine based on state data regarding the dialog that the response is now in the same language in which the dialog was initiated. The multi-assistant component 115 may thus send (336) the audio data representing the response to the speaker 112 for output as synthesized speech.

Figure 4:
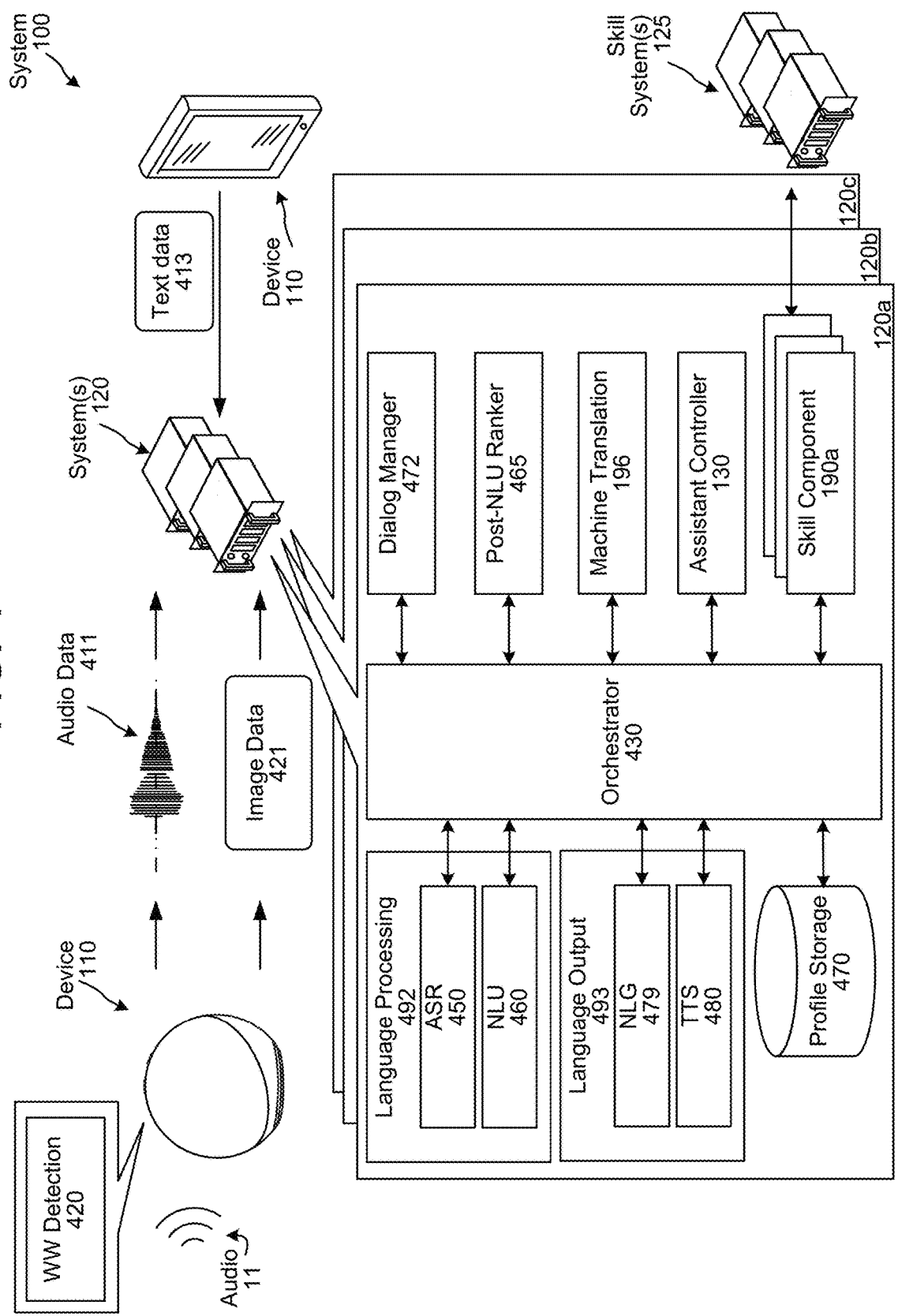
FIG. 4 is a conceptual diagram of components of the system, according to embodiments of the present disclosure.

The system 100 may operate using various components as described in FIG. 4. The various components may be located on same or different physical devices. Communication between various components may occur directly or across a network(s) 199. The device 110 may include audio capture component(s), such as a microphone or array of microphones of a device 110, captures audio 11 and creates corresponding audio data. Once speech is detected in audio data representing the audio 11, the device 110 may determine if the speech is directed at the device 110/system 120. In at least some embodiments, such determination may be made using a wakeword detection component 420. The wakeword detection component 420 may be configured to detect various wakewords. In at least some examples, a wakeword may correspond to a name of a different digital assistant. An example wakeword/digital assistant name is "Alexa." In another example, input to the system may be in form of text data 413, for example as a result of a user typing an input into a user interface of device 110. Other input forms may include indication that the user has pressed a physical or virtual button on device 110, the user has made a gesture, etc. The device 110 may also capture images using camera(s) 1118 of the device 110 and may send image data 421 representing those image(s) to the system 120. The image data 421 may include raw image data or image data processed by the device 110 before sending to the system 120.

The wakeword detector 420 of the device 110 may process the audio data, representing the audio 11, to determine whether speech is represented therein. The device 110 may use various techniques to determine whether the audio data includes speech. In some examples, the device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a classifier configured to distinguish speech from background noise. The classifier may be implemented by techniques such as linear classifiers, support vector machines, and decision trees. In still other examples, the device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is may be performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 420 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 420 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 420 and/or input is detected by an input detector, the device 110 may "wake" and begin transmitting audio data 411, representing the audio 11, to the system(s) 120. The audio data 411 may include data corresponding to the wakeword; in other embodiments, the portion of the audio corresponding to the wakeword is removed by the device 110 prior to sending the audio data 411 to the system(s) 120. In the case of touch input detection or gesture based input detection, the audio data may not include a wakeword.

In some implementations, the system 100 may include more than one system 120. The systems 120 may respond to different wakewords and/or perform different categories of tasks. A system 120 may be associated with its own wakeword such that speaking a certain wakeword results in audio data be sent to and processed by a particular system. For example, detection of the wakeword "Alexa" by the wakeword detector 420 may result in sending audio data to system 120a for processing while detection of the wakeword "Mandy" by the wakeword detector may result in sending audio data to system 120b for processing. The system may have a separate wakeword and system for different skills/systems (e.g., "Dungeon Master" for a game play skill/system 120c) and/or such skills/systems may be coordinated by one or more skill(s) 490 of one or more systems 120.

Upon receipt by the system(s) 120, the audio data 411 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 411 to a language processing component 492. The language processing component 492 (sometimes also referred to as a spoken language understanding (SLU) component) includes an automatic speech recognition (ASR) component 450 and a natural language understanding (NLU) component 460. The ASR component 450 may transcribe the audio data 411 into text data. The text data output by the ASR component 450 represents one or more than one (e.g., in the form of an N-best list) ASR hypotheses representing speech represented in the audio data 411. The ASR component 450 interprets the speech in the audio data 411 based on a similarity between the audio data 411 and pre-established language models. For example, the ASR component 450 may compare the audio data 411 with models for sounds (e.g., acoustic units such as phonemes, senons, phones, etc.) and sequences of sounds to identify words that match the sequence of sounds of the speech represented in the audio data 411. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein. The ASR component 450 is described in greater detail below with regard to FIG. 6.

The speech processing system 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the device 110, the system(s) 120, a skill component 490, a skill system(s) 125, etc.) to execute the intent. For example, if the text data corresponds to "play the $5^{th}$ Symphony by Beethoven," the NLU component 460 may determine an intent that the system output music and may identify "Beethoven" as an artist/composer and "$5^{th}$ Symphony" as the piece of music to be played. For further example, if the text data corresponds to "what is the weather," the NLU component 460 may determine an intent that the system output weather information associated with a geographic location of the device 110. In another example, if the text data corresponds to "turn off the lights," the NLU component 460 may determine an intent that the system turn off lights associated with the device 110 or the user 5. However, if the NLU component 460 is unable to resolve the entity—for example, because the entity is referred to by anaphora such as "this song" or "my next appointment"—the speech processing system 492 can send a decode request to another speech processing system 492 for information regarding the entity mention and/or other context related to the utterance. The speech processing system 492 may augment, correct, or base results data upon the audio data 411 as well as any data received from the other speech processing system 492.

The NLU component 460 may return NLU results data 885/825 (which may include tagged text data, indicators of intent, etc.) back to the orchestrator 430. The orchestrator 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data 885/825 includes an N-best list of NLU hypotheses, the NLU component 460 and the orchestrator component 430 may direct the top scoring NLU hypothesis to a skill component(s) 490 associated with the top scoring NLU hypothesis. The system may also include a post-NLU ranker 465 which may incorporate other information to rank potential interpretations determined by the NLU component 460. The local device 110 may also include its own post-NLU ranker, which may operate similarly to the post-NLU ranker 465. The NLU component 460, post-NLU ranker 465 and other components are described in greater detail below with regard to FIGS. 7 and 8.

A skill component may be software running on the system(s) 120 that is akin to a software application. That is, a skill component 490 may enable the system(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system(s) 120 may be configured with more than one skill component 490. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 490 may operate in conjunction between the system(s) 120 and other devices, such as the device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system(s) 125 may communicate with a skill component(s) 490 within the system(s) 120 and/or directly with the orchestrator component 430 or with other components. A skill support system(s) 125 may be configured to perform one or more actions. An ability to perform such action(s) may sometimes be referred to as a "skill." That is, a skill may enable a skill support system(s) 125 to execute specific functionality in order to provide data or perform some other action requested by a user. For example, a weather service skill may enable a skill support system(s) 125 to provide weather information to the system(s) 120, a car service skill may enable a skill support system(s) 125 to book a trip with respect to a taxi or ride sharing service, an order pizza skill may enable a skill support system(s) 125 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system(s) 120 may be configured with a skill component 490 dedicated to interacting with the skill support system(s) 125. Unless expressly stated otherwise, reference to a skill, skill device, or skill component may include a skill component 490 operated by the system(s) 120 and/or skill operated by the skill support system(s) 125. Moreover, the functionality described herein as a skill or skill may be referred to using many different terms, such as an action, bot, app, or the like. The skill 490 and or skill support system(s) 125 may return output data to the orchestrator 430.

The system 120 may include a machine translation (MT) engine 196. The MT engine 196 may translate natural language from a first language into a second language. For example, the MT engine 196 may receive first natural language in the form of text in a first language from the language processing component 192/492 and send text in a second language to the language output component 193/493 for generating synthesized speech in the second language. In some implementations, the MT engine 196 may perform translations at other points in a speech processing pipeline; for example, between ASR 450 and NLU 460, or between NLG 479 and TTS 480. In some implementations, the MT engine 196 may translate data from the language processing component 192/492 prior to receipt by a skill component 190a, or translate data from a skill component 190 prior to receipt by the language output component 193/493. In some implementations, the MT engine 196 may be implemented as a skill component 190. The MT engine 196 is described in additional detail below with reference to FIG. 9.

Dialog processing is a field of computer science that involves communication between a computing system and a human via text, audio, and/or other forms of communication. While some dialog processing involves only simple generation of a response given only a most recent input from a user (i.e., single-turn dialog), more complicated dialog processing involves determining and optionally acting on one or more goals expressed by the user over multiple turns of dialog, such as making a restaurant reservation and/or booking an airline ticket. These multi-turn "goal-oriented" dialog systems may recognize, retain, and use information collected during more than one input during a back-and-forth or "multi-turn" interaction with the user; for example, information regarding a language in which a dialog is being conducted.

The system(s) 100 may include a dialog manager component 572 that manages and/or tracks a dialog between a user and a device, and in some cases between the user and one or more systems 120. As used herein, a "dialog" may refer to data transmissions (such as relating to multiple user inputs and system 100 outputs) between the system 100 and a user (e.g., through device(s) 110) that all relate to a single "conversation" between the system and the user that may have originated with a single user input initiating the dialog. Thus, the data transmissions of a dialog may be associated with a same dialog identifier, which may be used by components of the overall system 100 to track information across the dialog. Subsequent user inputs of the same dialog may or may not start with speaking of a wakeword. Each natural language input of a dialog may be associated with a different natural language input identifier such that multiple natural language input identifiers may be associated with a single dialog identifier. Further, other non-natural language inputs (e.g., image data, gestures, button presses, etc.) may relate to a particular dialog depending on the context of the inputs. For example, a user may open a dialog with the system 100 to request a food delivery in a spoken utterance and the system may respond by displaying images of food available for order and the user may speak a response (e.g., "item 1" or "that one") or may gesture a response (e.g., point to an item on the screen or give a thumbs-up) or may touch the screen on the desired item to be selected. Non-speech inputs (e.g., gestures, screen touches, etc.) may be part of the dialog and the data associated therewith may be associated with the dialog identifier of the dialog.

The dialog manager component 572 may associate a dialog session identifier with the dialog upon identifying that the user is engaging in a dialog with the user. The dialog manager component 572 may track a user input and the corresponding system generated response to the user input as a turn. The dialog session identifier may correspond to multiple turns of user input and corresponding system generated response. The dialog manager component 572 may transmit data identified by the dialog session identifier directly to the orchestrator component 430 or other component. Depending on system configuration the dialog manager 572 may determine the appropriate system generated response to give to a particular utterance or user input of a turn. Or creation of the system generated response may be managed by another component of the system (e.g., the language output component 493, NLG 479, orchestrator 430, etc.) while the dialog manager 572 selects the appropriate responses. Alternatively, another component of the system(s) 120 may select responses using techniques discussed herein. The text of a system generated response may be sent to a TTS component 480 for creation of audio data corresponding to the response. The audio data may then be sent to a user device (e.g., device 110) for ultimate output to the user. Alternatively (or in addition) a dialog response may be returned in text or some other form.

The dialog manager 572 may receive the ASR hypothesis/hypotheses (i.e., text data) and make a semantic interpretation of the phrase(s) or statement(s) represented therein. That is, the dialog manager 572 determines one or more meanings associated with the phrase(s) or statement(s) represented in the text data based on words represented in the text data. The dialog manager 572 determines a goal corresponding to an action that a user desires be performed as well as pieces of the text data that allow a device (e.g., the device 110, the system(s) 120, a skill 490, a skill system(s) 125, etc.) to execute the intent. If, for example, the text data corresponds to "what is the weather," the dialog manager 572 may determine that that the system(s) 120 is to output weather information associated with a geographic location of the device 110. In another example, if the text data corresponds to "turn off the lights," the dialog manager 572 may determine that the system(s) 120 is to turn off lights associated with the device(s) 110 or the user(s) 5.

The dialog manager 572 may send the results data to one or more skill(s) 490. If the results data includes a single hypothesis, the orchestrator component 430 may send the results data to the skill(s) 490 associated with the hypothesis. If the results data includes an N-best list of hypotheses, the orchestrator component 430 may send the top scoring hypothesis to a skill(s) 490 associated with the top scoring hypothesis.

The system 120 includes a language output component 493. The language output component 493 includes a natural language generation (NLG) component 479 and a text-to-speech (TTS) component 480. The NLG component 479 can generate text for purposes of TTS output to a user. For example the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data 1010 discussed below). Alternatively or in addition, the TTS component 480 may receive text data from a skill 490 or other system component for output.

The NLG component 479 may include a trained model. The NLG component 479 generates text data 1010 from dialog data received by the dialog manager 572 such that the output text data 1010 has a natural feel and, in some embodiments, includes words and/or phrases specifically formatted for a requesting individual. The NLG may use templates to formulate responses. And/or the NLG system may include models trained from the various templates for forming the output text data 1010. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NLG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system such as the MT engine 196. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder. The TTS component 480 may be capable of generating output audio representing natural language speech in one or more natural languages (e.g., English, Mandarin, French, etc.) based on, for example, translated segments received from the MT engine 196.

The system 100 (either on device 110, system 120, or a combination thereof) may include profile storage for storing a variety of information related to individual users, groups of users, devices, etc. that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a device 110, the user profile (associated with the presented login information) may be updated to include information about the device 110, for example with an indication that the device is currently in use. Each user profile may include identifiers of skills that the user has enabled. When a user enables a skill, the user may give the system 120 permission to allow the skill to execute with respect to the user's natural language user inputs. If a user does not enable a skill, the system 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

Figure 5:
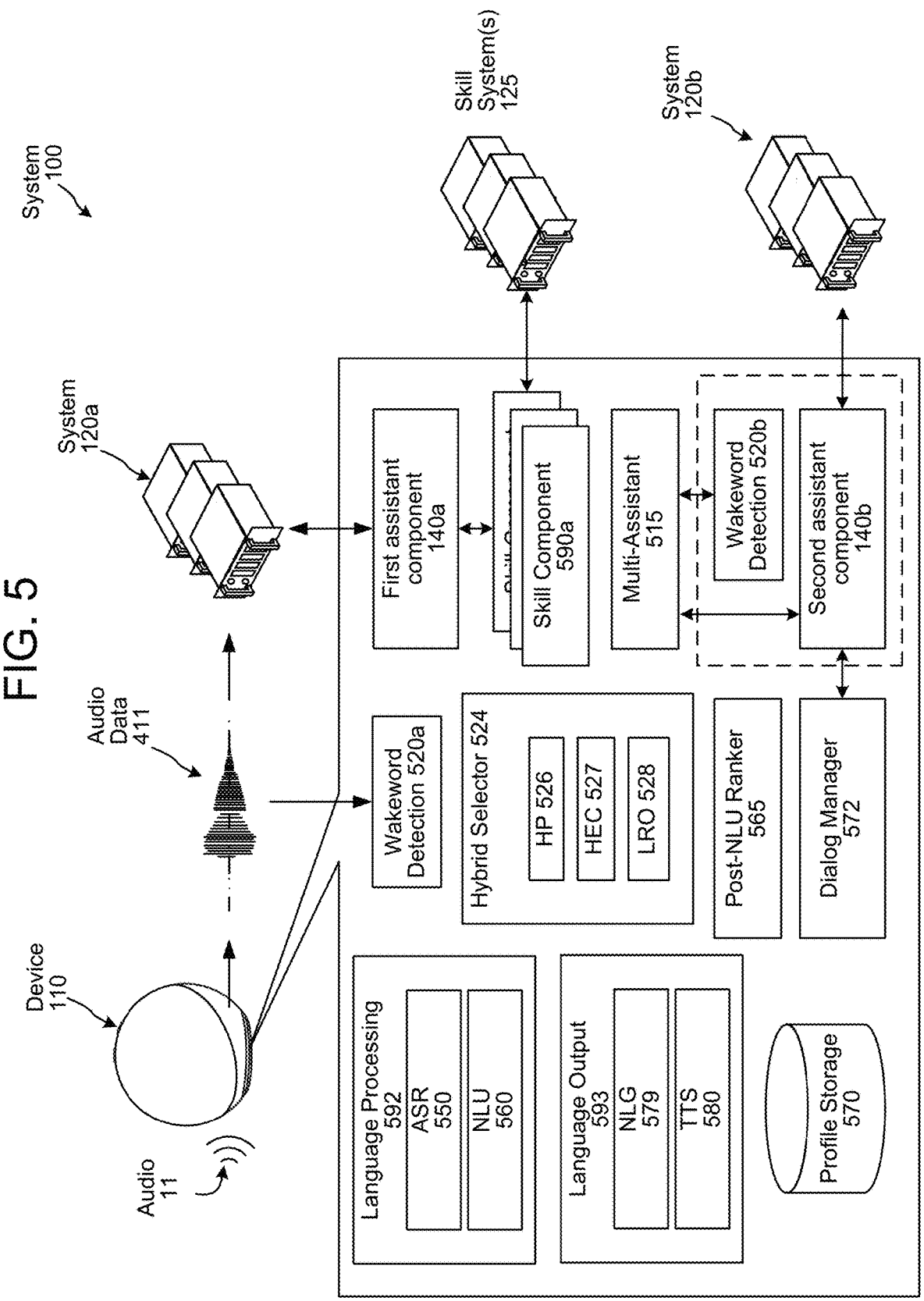
FIG. 5 is a conceptual diagram illustrating components that may be included in a device, according to embodiments of the present disclosure.

Although the components of FIG. 4 may be illustrated as part of system(s) 120, device 110, or otherwise, the components may be arranged in other device(s) (such as in device 110 if illustrated in system(s) 120 or vice-versa, or in other device(s) altogether) without departing from the disclosure. FIG. 5 illustrates such a configured device 110.

In the example system 100 shown in FIG. 5, the device 110 includes the first assistant component 140a and the second assistant component 140b. The first assistant component 140a may be in communication with back-end components of the first system 120a (e.g., via the network 199). The first assistant component 140a may also be in communication with the language processing component 592, the language output component 593, a first wakeword detector 520a, and/or hybrid selector 524. The first system 120a may be associated with one or more local skill components 590a, 590b, and 590c (collectively "skill components 590") (in addition to skill components 190 residing on or associated with the first system 120a, but not residing in the device 110). The local skill components 590 may be in communication with one or more skill support systems 125. The second assistant component 140b may be associated with the second system 120b, which may be a separate computing system separate and remote from the device 110. The first system 120a and the second system 120b be configured as described herein; for example, as described with respect to FIG. 1A and FIG. 4.

The second assistant component 140b may be logically or otherwise walled off from certain components of the device 110. The second assistant component 140b may include or be associated with its own proprietary components. For example, the second assistant component 140b may be associated with a second wakeword detector 520b. In addition, the second assistant component 140b may leverage separate language processing and language output components, which may reside in the device 110 or the second system 120b. The second assistant component 140b may, however, interface with a multi-assistant component 515 and/or a dialog manager 472, which may be shared between the first assistant component 140a and the second assistant component 140b. The multi-assistant component 515 may operate similarly to the multi-assistant component 115 previously described.

In some implementations, speech processing of input audio data directed to the first system 120a may take place on the device 110. The device 110 may send a message represented in the input audio data to the second system 120b without first sending the input audio data to the first system 120a. For example, the device 110 may receive the input audio data and detect, with the first wakeword detection component 520a, a wakeword corresponding to the first system 120a. The language processing components 592 of the device 110 may process the input audio data and determine that the input audio data represents a request to generate a message and send the message to the second system 120b. The first assistant component 140a may receive the output of the language processing components 592, and forward it to the multi-assistant component 515. The first assistant component 140a may include with the output metadata that indicates that the multi-assistant component 515 is to forward the output to the second system 120b (e.g., via the second assistant component 140b). In some cases, the first assistant component 140a may send the output to the language output components 593 to generate an output in the form of output audio data (e.g., a TTS output) representing the output. The multi-assistant component 593 may receive the output (or output audio data) and metadata, and determine that the output is to be processed by the second system 120b. The multi-assistant component 515 may send the output to the second assistant component 140b. The second assistant component 140b may send the output to the second system 120b. The second system 120b may process the output by, for example, executing a command represented in the output. The system 120b may return response data to the device 110; for example, by sending responsive output audio data to the multi-assistant component 515 for output by a speaker of the device.

In some implementations, the operations described in the previous paragraph may be augmented to perform machine translation of a message to the second system 120b using a MT engine 196 of the first system 120a. Following speech processing by the language processing component 592, the device 110 may determine that the input audio data represents a request to translate a message to the second system 120b. The first assistant component 140a may send the output to the first system 120a for translation by the MT engine 196a. The device 110 may receive the translated output from the first system 120a. The device 110 may use the language output components 593 to generate output audio data representing the translated output. The multi-assistant component 515 may receive the output audio data representing the translated output, and send it to the second assistant component 140b. The second assistant component 140b may send the output audio data to the second system 120b for processing.

In some cases, the multi-assistant component 515 may determine (for example, based on state data regarding an active dialog that includes the input audio data) that the response data from the second system 120b is to be translated back into the language of the input audio data. The multi-assistant component 515 may send the response data to the first system 120a via the first assistant component 140a along with an indication that the response data is to be translated. The response data may, for example, be audio data and/or text data. The first system 120a may return translated response data. The translated response data may be audio data and/or text data. if the translated response data is text data, the multi-assistant component 515 may send it to the language output components 593 for conversion into synthetic speech for output by the device 110.

In at least some embodiments, the system 120 may receive the audio data 411 from the device 110, to recognize speech corresponding to a spoken input in the received audio data 411, and to perform functions in response to the recognized speech. In at least some embodiments, these functions involve sending directives (e.g., commands), from the system 120 to the device 110 (and/or other devices 110) to cause the device 110 to perform an action, such as output an audible response to the spoken input via a loudspeaker(s), and/or control secondary devices in the environment by sending a control command to the secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output an audible response (e.g., using TTS processing performed by an on-device TTS component 580) to a user's question via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It is to be appreciated that the system 120 may be configured to provide other functions in addition to those discussed herein, such as, without limitation, providing step-by-step directions for navigating from an origin location to a destination location, conducting an electronic commerce transaction on behalf of the user 5 as part of a shopping function, establishing a communication session (e.g., a video call) between the user 5 and another user, and so on.

The device 110 may include one or more wakeword detection components 520a and/or 520b configured to compare the audio data 411 to stored models used to detect a wakeword (e.g., "Alexa") that indicates to the device 110 that the audio data 411 is to be processed for determining NLU output data (e.g., slot data that corresponds to a named entity, label data, and/or intent data, etc.). In at least some embodiments, a hybrid selector 524, of the device 110, may send the audio data 411 to the wakeword detection component 520a. If the wakeword detection component 520a detects a wakeword in the audio data 411, the wakeword detection component 520a may send an indication of such detection to the hybrid selector 524. In response to receiving the indication, the hybrid selector 524 may send the audio data 411 to the system 120 and/or the ASR component 550. The wakeword detection component 520a may also send an indication, to the hybrid selector 524, representing a wakeword was not detected. In response to receiving such an indication, the hybrid selector 524 may refrain from sending the audio data 411 to the system 120, and may prevent the ASR component 550 from further processing the audio data 411. In this situation, the audio data 411 can be discarded.

The device 110 may conduct its own speech processing using on-device language processing components, such as an SLU/language processing component 592 (which may include an ASR component 550 and an NLU 560), similar to the manner discussed herein with respect to the SLU component 492 (or ASR component 450 and the NLU component 460) of the system 120. Language processing component 592 may operate similarly to language processing component 492, ASR component 550 may operate similarly to ASR component 450 and NLU component 560 may operate similarly to NLU component 460. The device 110 may also internally include, or otherwise have access to, other components such as one or more skill components 590 capable of executing commands based on NLU output data or other results determined by the device 110/system 120 (which may operate similarly to skill components 490), profile storage 570 (configured to store similar profile data to that discussed herein with respect to the profile storage 470 of the system 120), or other components. In at least some embodiments, the profile storage 570 may only store profile data for a user or group of users specifically associated with the device 110. Similar to as described above with respect to skill component 490, a skill component 590 may communicate with a skill system(s) 125. The device 110 may also have its own language output component 593 which may include NLG component 579 and TTS component 580. Language output component 593 may operate similarly to language processing component 492, NLG component 579 may operate similarly to NLG component 479 and TTS component 580 may operate similarly to TTS component 480.

In at least some embodiments, the on-device language processing components may not have the same capabilities as the language processing components of the system 120. For example, the on-device language processing components may be configured to handle only a subset of the natural language user inputs that may be handled by the system 120. For example, such subset of natural language user inputs may correspond to local-type natural language user inputs, such as those controlling devices or components associated with a user's home. In such circumstances the on-device language processing components may be able to more quickly interpret and respond to a local-type natural language user input, for example, than processing that involves the system 120. If the device 110 attempts to process a natural language user input for which the on-device language processing components are not necessarily best suited, the language processing results determined by the device 110 may indicate a low confidence or other metric indicating that the processing by the device 110 may not be as accurate as the processing done by the system 120.

The hybrid selector 524, of the device 110, may include a hybrid proxy (HP) 526 configured to proxy traffic to/from the system 120. For example, the HP 526 may be configured to send messages to/from a hybrid execution controller (HEC) 527 of the hybrid selector 524. For example, command/directive data received from the system 120 can be sent to the HEC 527 using the HP 526. The HP 526 may also be configured to allow the audio data 411 to pass to the system 120 while also receiving (e.g., intercepting) this audio data 411 and sending the audio data 411 to the HEC 527.

In at least some embodiments, the hybrid selector 524 may further include a local request orchestrator (LRO) 528 configured to notify the ASR component 550 about the availability of new audio data 411 that represents user speech, and to otherwise initiate the operations of local language processing when new audio data 411 becomes available. In general, the hybrid selector 524 may control execution of local language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 411 is received, the HP 526 may allow the audio data 411 to pass through to the system 120 and the HP 526 may also input the audio data 411 to the on-device ASR component 550 by routing the audio data 411 through the HEC 527 of the hybrid selector 524, whereby the LRO 528 notifies the ASR component 550 of the audio data 411. At this point, the hybrid selector 524 may wait for response data from either or both of the system 120 or the local language processing components. However, the disclosure is not limited thereto, and in some examples the hybrid selector 524 may send the audio data 411 only to the local ASR component 550 without departing from the disclosure. For example, the device 110 may process the audio data 411 locally without sending the audio data 411 to the system 120.

The local ASR component 550 is configured to receive the audio data 411 from the hybrid selector 524, and to recognize speech in the audio data 411, and the local NLU component 560 is configured to determine a user intent from the recognized speech, and to determine how to act on the user intent by generating NLU output data which may include directive data (e.g., instructing a component to perform an action). Such NLU output data may take a form similar to that as determined by the NLU component 460 of the system 120. In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

An NLU hypothesis (output by the NLU component 560) may be selected as usable to respond to a natural language user input, and local response data may be sent (e.g., local NLU output data, local knowledge base information, internet search results, and/or local directive data) to the hybrid selector 524, such as a "ReadyToExecute" response. The hybrid selector 524 may then determine whether to use directive data from the on-device components to respond to the natural language user input, to use directive data received from the system 120, assuming a remote response is even received (e.g., when the device 110 is able to access the system 120 over the network(s) 199), or to determine output audio requesting additional information from the user 5.

The device 110 and/or the system 120 may associate a unique identifier with each natural language user input. The device 110 may include the unique identifier when sending the audio data 411 to the system 120, and the response data from the system 120 may include the unique identifier to identify which natural language user input the response data corresponds.

In at least some embodiments, the device 110 may include, or be configured to use, one or more skill components 590 that may work similarly to the skill component(s) 490 implemented by the system 120. The skill component(s) 590 may correspond to one or more domains that are used in order to determine how to act on a spoken input in a particular way, such as by outputting a directive that corresponds to the determined intent, and which can be processed to implement the desired operation. The skill component(s) 590 installed on the device 110 may include, without limitation, a smart home skill component (or smart home domain) and/or a device control skill component (or device control domain) to execute in response to spoken inputs corresponding to an intent to control a second device(s) in an environment, a music skill component (or music domain) to execute in response to spoken inputs corresponding to a intent to play music, a navigation skill component (or a navigation domain) to execute in response to spoken input corresponding to an intent to get directions, a shopping skill component (or shopping domain) to execute in response to spoken inputs corresponding to an intent to buy an item from an electronic marketplace, and/or the like.

Additionally or alternatively, the device 110 may be in communication with one or more skill systems 125. For example, a skill system 125 may be located in a remote environment (e.g., separate location) such that the device 110 may only communicate with the skill system 125 via the network(s) 199. However, the disclosure is not limited thereto. For example, in at least some embodiments, a skill system 125 may be configured in a local environment (e.g., home server and/or the like) such that the device 110 may communicate with the skill system 125 via a private network, such as a local area network (LAN).

As used herein, a "skill" may refer to a skill component 590, a skill system 125, or a combination of a skill component 590 and a corresponding skill system 125. Similar to the manner discussed with regard to FIG. 4, the local device 110 may be configured to recognize multiple different wakewords and/or perform different categories of tasks depending on the wakeword. Such different wakewords may invoke different processing components of local device 110 (not illustrated in FIG. 5). For example, detection of the wakeword "Alexa" by the wakeword detector 520a may result in sending audio data to certain language processing components 592/skills 590 for processing while detection of the wakeword "Computer" by the wakeword detector may result in sending audio data different language processing components 592/skills 590 for processing.

Figure 6:
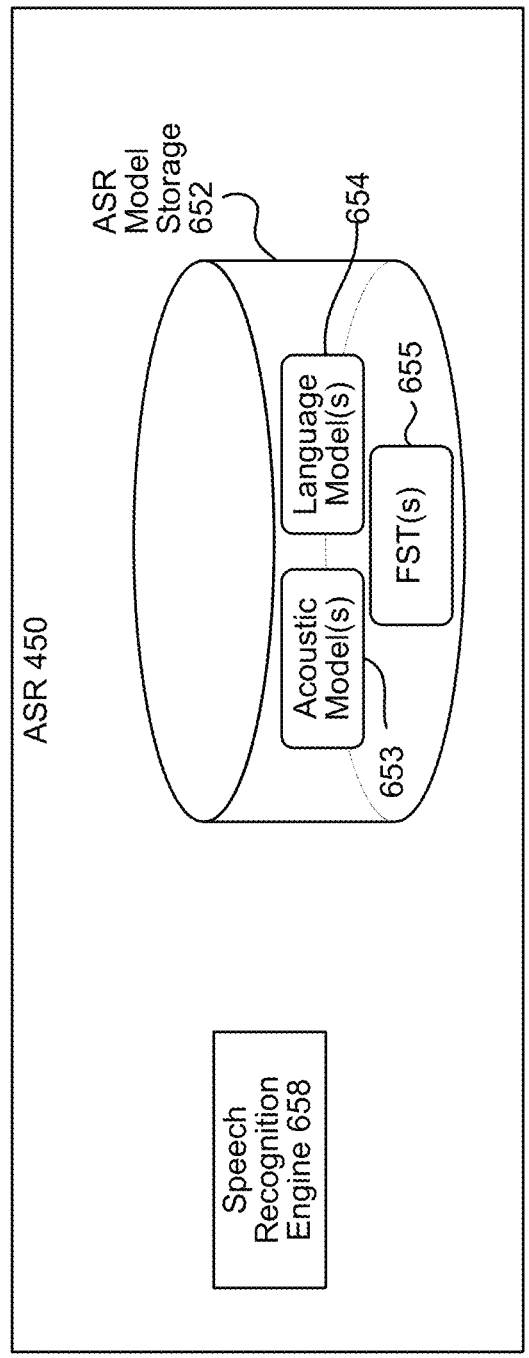
FIG. 6 is a conceptual diagram of an ASR component, according to embodiments of the present disclosure.

FIG. 6 is a conceptual diagram of an ASR component 450, according to embodiments of the present disclosure. The ASR component 450 may interpret a spoken natural language input based on the similarity between the spoken natural language input and pre-established language models 654 stored in an ASR model storage 652. For example, the ASR component 450 may compare the audio data with models for sounds (e.g., subword units or phonemes) and sequences of sounds to identify words that match the sequence of sounds spoken in the natural language input. Alternatively, the ASR component 450 may use a finite state transducer (FST) 655 to implement the language model functions.

When the ASR component 450 generates more than one ASR hypothesis for a single spoken natural language input, each ASR hypothesis may be assigned a score (e.g., probability score, confidence score, etc.) representing a likelihood that the corresponding ASR hypothesis matches the spoken natural language input (e.g., representing a likelihood that a particular set of words matches those spoken in the natural language input). The score may be based on a number of factors including, for example, the similarity of the sound in the spoken natural language input to models for language sounds (e.g., an acoustic model 653 stored in the ASR model storage 652), and the likelihood that a particular word, which matches the sounds, would be included in the sentence at the specific location (e.g., using a language or grammar model 654). Based on the considered factors and the assigned confidence score, the ASR component 450 may output an ASR hypothesis that most likely matches the spoken natural language input, or may output multiple ASR hypotheses in the form of a lattice or an N-best list, with each ASR hypothesis corresponding to a respective score.

The ASR component 450 may include a speech recognition engine 658. The ASR component 450 receives audio data 411 (for example, received from a local device 110 having processed audio detected by a microphone by an acoustic front end (AFE) or other component). The speech recognition engine 658 compares the audio data 411 with acoustic models 653, language models 654, FST(s) 655, and/or other data models and information for recognizing the speech conveyed in the audio data. The audio data 411 may be audio data that has been digitized (for example by an AFE) into frames representing time intervals for which the AFE determines a number of values, called features, representing the qualities of the audio data, along with a set of those values, called a feature vector, representing the features/qualities of the audio data within the frame. In at least some embodiments, audio frames may be 10 ms each. Many different features may be determined, as known in the art, and each feature may represent some quality of the audio that may be useful for ASR processing. A number of approaches may be used by an AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The speech recognition engine 658 may process the audio data 411 with reference to information stored in the ASR model storage 652. Feature vectors of the audio data 411 may arrive at the system 120 encoded, in which case they may be decoded prior to processing by the speech recognition engine 658.

The speech recognition engine 658 attempts to match received feature vectors to language acoustic units (e.g., phonemes) and words as known in the stored acoustic models 653, language models 4B54, and FST(s) 655. For example, audio data 411 may be processed by one or more acoustic model(s) 653 to determine acoustic unit data. The acoustic unit data may include indicators of acoustic units detected in the audio data 411 by the ASR component 450. For example, acoustic units can consist of one or more of phonemes, diaphonemes, tonemes, phones, diphones, triphones, or the like. The acoustic unit data can be represented using one or a series of symbols from a phonetic alphabet such as the X-SAMPA, the International Phonetic Alphabet, or Initial Teaching Alphabet (ITA) phonetic alphabets. In some implementations a phoneme representation of the audio data can be analyzed using an n-gram based tokenizer. An entity, or a slot representing one or more entities, can be represented by a series of n-grams.

The acoustic unit data may be processed using the language model 654 (and/or using FST 655) to determine ASR data 810. The ASR data 810 can include one or more hypotheses. One or more of the hypotheses represented in the ASR data 810 may then be sent to further components (such as the NLU component 460) for further processing as discussed herein. The ASR data 810 may include representations of text of an utterance, such as words, subword units, or the like.

The speech recognition engine 658 computes scores for the feature vectors based on acoustic information and language information. The acoustic information (such as identifiers for acoustic units and/or corresponding scores) is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR component 450 will output ASR hypotheses that make sense grammatically. The specific models used may be general models or may be models corresponding to a particular domain, such as music, banking, etc.

The speech recognition engine 658 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using FSTs, may also be used.

The speech recognition engine 658 may use the acoustic model(s) 653 to attempt to match received audio feature vectors to words or subword acoustic units. An acoustic unit may be a senone, phoneme, phoneme in context, syllable, part of a syllable, syllable in context, or any other such portion of a word. The speech recognition engine 658 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR component 450 outputs ASR hypotheses that make sense grammatically.

The speech recognition engine 658 may use a number of techniques to match feature vectors to phonemes or other acoustic units, such as diphones, triphones, etc. One common technique is using Hidden Markov Models (HMMs). HMMs are used to determine probabilities that feature vectors may match phonemes. Using HMMs, a number of states are presented, in which the states together represent a potential phoneme (or other acoustic unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the speech recognition engine 658, the state may change or stay the same, based on the processing of the new feature vectors. A Viterbi algorithm may be used to find the most likely sequence of states based on the processed feature vectors.

The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 658 may also compute scores of branches of the paths based on language models or grammars. Language modeling involves determining scores for what words are likely to be used together to form coherent words and sentences. Application of a language model may improve the likelihood that the ASR component 450 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 7:
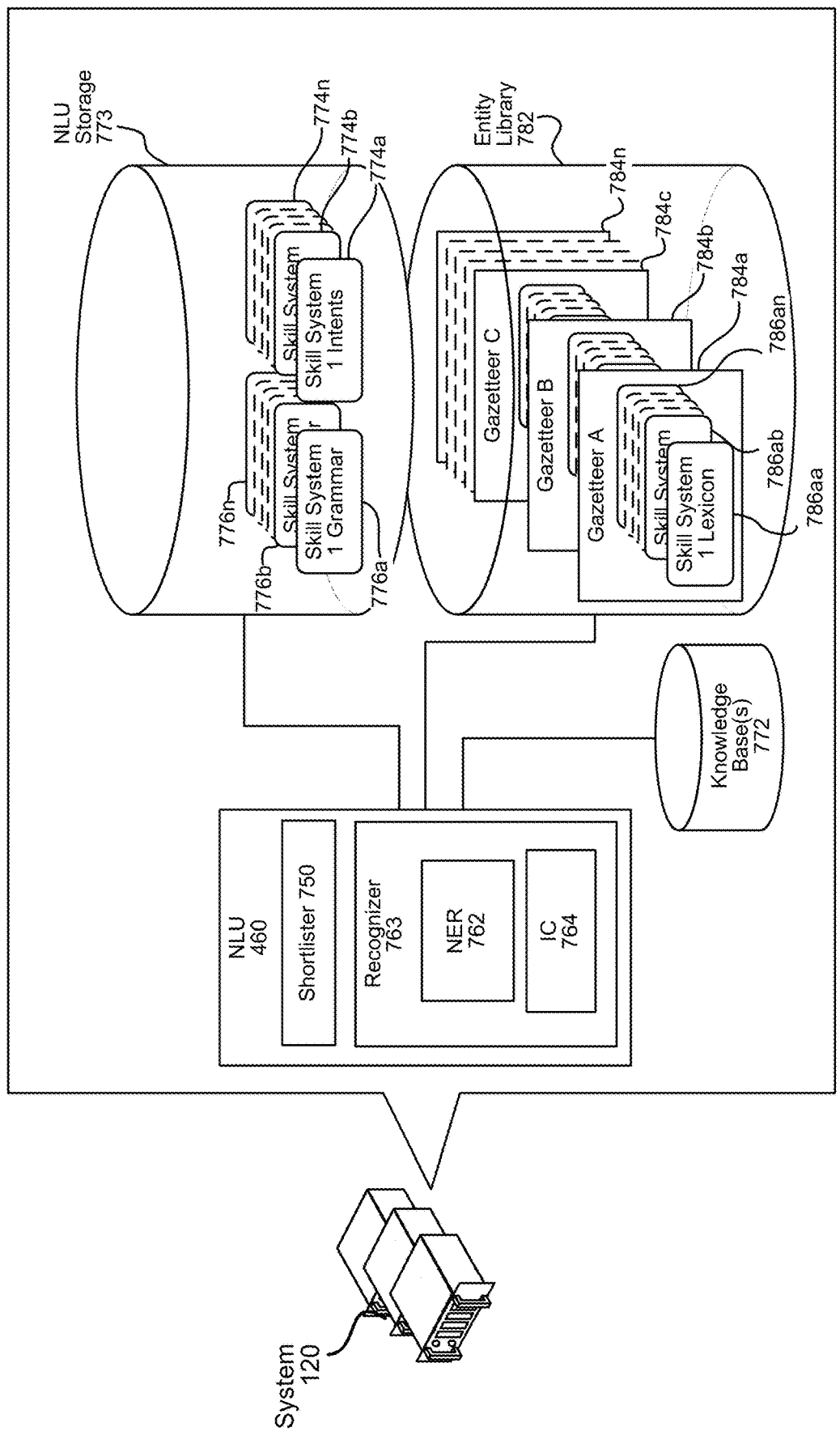
FIG. 7 is a conceptual diagram of how natural language processing is performed, according to embodiments of the present disclosure.
Figure 8:
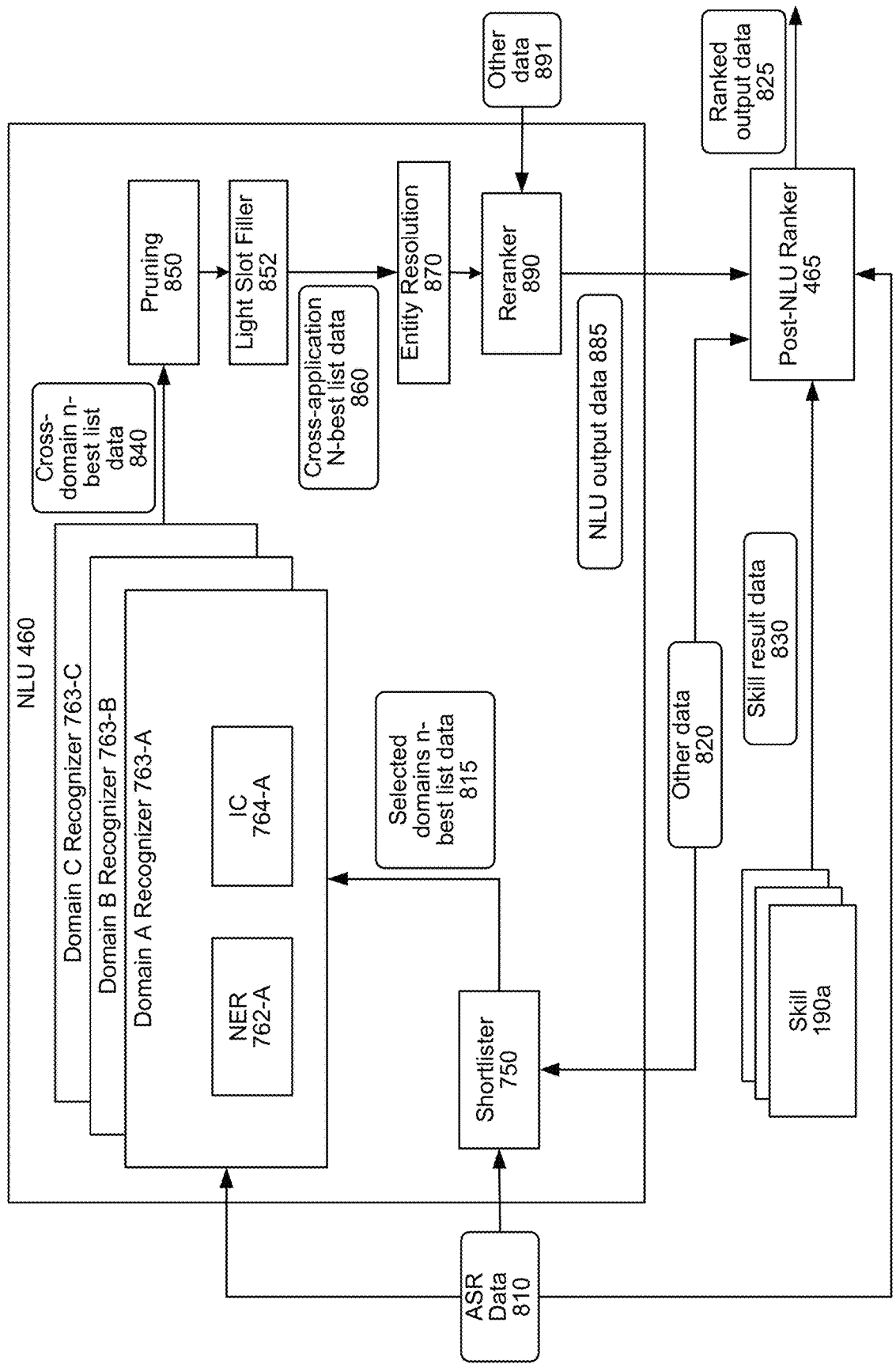
FIG. 8 is a conceptual diagram of how natural language processing is performed, according to embodiments of the present disclosure.

FIGS. 7 and 8 illustrates how the NLU component 460 may perform NLU processing. FIG. 7 is a conceptual diagram of how natural language processing is performed, according to embodiments of the present disclosure. And FIG. 8 is a conceptual diagram of how natural language processing is performed, according to embodiments of the present disclosure.

FIG. 7 illustrates how NLU processing is performed on text data. The NLU component 460 may process text data including several ASR hypotheses of a single user input. For example, if the ASR component 450 outputs text data including an n-best list of ASR hypotheses, the NLU component 460 may process the text data with respect to all (or a portion of) the ASR hypotheses represented therein.

The NLU component 460 may annotate text data by parsing and/or tagging the text data. For example, for the text data "tell me the weather for Seattle," the NLU component 460 may tag "tell me the weather for Seattle" as an <OutputWeather> intent as well as separately tag "Seattle" as a location for the weather information.

The NLU component 460 may include a shortlister component 750. The shortlister component 750 selects skills that may execute with respect to ASR output data 810 input to the NLU component 460 (e.g., applications that may execute with respect to the user input). The ASR output data 810 (which may also be referred to as ASR data 810) may include representations of text of an utterance, such as words, subword units, or the like. The shortlister component 750 thus limits downstream, more resource intensive NLU processes to being performed with respect to skills that may execute with respect to the user input.

Without a shortlister component 750, the NLU component 460 may process ASR output data 810 input thereto with respect to every skill of the system, either in parallel, in series, or using some combination thereof. By implementing a shortlister component 750, the NLU component 460 may process ASR output data 810 with respect to only the skills that may execute with respect to the user input. This reduces total compute power and latency attributed to NLU processing.

The shortlister component 750 may include one or more trained models. The model(s) may be trained to recognize various forms of user inputs that may be received by the system(s) 120. For example, during a training period skill system(s) 125 associated with a skill may provide the system(s) 120 with training text data representing sample user inputs that may be provided by a user to invoke the skill. For example, for a ride sharing skill, a skill system(s) 125 associated with the ride sharing skill may provide the system(s) 120 with training text data including text corresponding to "get me a cab to [location]," "get me a ride to [location]," "book me a cab to [location]," "book me a ride to [location]," etc. The one or more trained models that will be used by the shortlister component 750 may be trained, using the training text data representing sample user inputs, to determine other potentially related user input structures that users may try to use to invoke the particular skill. During training, the system(s) 120 may solicit the skill system(s) 125 associated with the skill regarding whether the determined other user input structures are permissible, from the perspective of the skill system(s) 125, to be used to invoke the skill. The alternate user input structures may be derived by one or more trained models during model training and/or may be based on user input structures provided by different skills. The skill system(s) 125 associated with a particular skill may also provide the system(s) 120 with training text data indicating grammar and annotations. The system(s) 120 may use the training text data representing the sample user inputs, the determined related user input(s), the grammar, and the annotations to train a model(s) that indicates when a user input is likely to be directed to/handled by a skill, based at least in part on the structure of the user input. Each trained model of the shortlister component 750 may be trained with respect to a different skill. Alternatively, the shortlister component 750 may use one trained model per domain, such as one trained model for skills associated with a weather domain, one trained model for skills associated with a ride sharing domain, etc.

The system(s) 120 may use the sample user inputs provided by a skill system(s) 125, and related sample user inputs potentially determined during training, as binary examples to train a model associated with a skill associated with the skill system(s) 125. The model associated with the particular skill may then be operated at runtime by the shortlister component 750. For example, some sample user inputs may be positive examples (e.g., user inputs that may be used to invoke the skill). Other sample user inputs may be negative examples (e.g., user inputs that may not be used to invoke the skill).

As described above, the shortlister component 750 may include a different trained model for each skill of the system, a different trained model for each domain, or some other combination of trained model(s). For example, the shortlister component 750 may alternatively include a single model. The single model may include a portion trained with respect to characteristics (e.g., semantic characteristics) shared by all skills of the system. The single model may also include skill-specific portions, with each skill-specific portion being trained with respect to a specific skill of the system. Implementing a single model with skill-specific portions may result in less latency than implementing a different trained model for each skill because the single model with skill-specific portions limits the number of characteristics processed on a per skill level.

The portion trained with respect to characteristics shared by more than one skill may be clustered based on domain. For example, a first portion of the portion trained with respect to multiple skills may be trained with respect to weather domain skills, a second portion of the portion trained with respect to multiple skills may be trained with respect to music domain skills, a third portion of the portion trained with respect to multiple skills may be trained with respect to travel domain skills, etc.

Clustering may not be beneficial in every instance because it may cause the shortlister component 750 to output indications of only a portion of the skills that the ASR output data 810 may relate to. For example, a user input may correspond to "tell me about Tom Collins." If the model is clustered based on domain, the shortlister component 750 may determine the user input corresponds to a recipe skill (e.g., a drink recipe) even though the user input may also correspond to an information skill (e.g., including information about a person named Tom Collins).

The NLU component 460 may include one or more recognizers 763. In at least some embodiments, a recognizer 763 may be associated with a skill system 125 (e.g., the recognizer may be configured to interpret text data to correspond to the skill system 125). In at least some other examples, a recognizer 763 may be associated with a domain such as smart home, video, music, weather, custom, etc. (e.g., the recognizer may be configured to interpret text data to correspond to the domain).

If the shortlister component 750 determines ASR output data 810 is potentially associated with multiple domains, the recognizers 763 associated with the domains may process the ASR output data 810, while recognizers 763 not indicated in the shortlister component 750's output may not process the ASR output data 810. The "shortlisted" recognizers 763 may process the ASR output data 810 in parallel, in series, partially in parallel, etc. For example, if ASR output data 810 potentially relates to both a communications domain and a music domain, a recognizer associated with the communications domain may process the ASR output data 810 in parallel, or partially in parallel, with a recognizer associated with the music domain processing the ASR output data 810.

Each recognizer 763 may include a named entity recognition (NER) component 762. The NER component 762 attempts to identify grammars and lexical information that may be used to construe meaning with respect to text data input therein. The NER component 762 identifies portions of text data that correspond to a named entity associated with a domain, associated with the recognizer 763 implementing the NER component 762. The NER component 762 (or other component of the NLU component 460) may also determine whether a word refers to an entity whose identity is not explicitly mentioned in the text data, for example "him," "her," "it" or other anaphora, exophora, or the like.

Each recognizer 763, and more specifically each NER component 762, may be associated with a particular grammar database 776 and a particular set of intents/actions 774 that may be stored in an NLU storage 773, and a particular personalized lexicon 786 that may be stored in an entity library 782. Each gazetteer 784 may include domain/skill-indexed lexical information associated with a particular user and/or device 110. For example, a Gazetteer A (784*a*) includes skill-indexed lexical information 786*aa* to 786*an*. A user's music domain lexical information might include album titles, artist names, and song names, for example, whereas a user's communications domain lexical information might include the names of contacts. Since every user's music collection and contact list is presumably different. This personalized information improves later performed entity resolution.

An NER component 762 applies grammar information 776 and lexical information 786 associated with a domain (associated with the recognizer 763 implementing the NER component 762) to determine a mention of one or more entities in text data. In this manner, the NER component 762 identifies "slots" (each corresponding to one or more particular words in text data) that may be useful for later processing. The NER component 762 may also label each slot with a type (e.g., noun, place, city, artist name, song name, etc.).

Each grammar database 776 includes the names of entities (i.e., nouns) commonly found in speech about the particular domain to which the grammar database 776 relates, whereas the lexical information 786 is personalized to the user and/or the device 110 from which the user input originated. For example, a grammar database 776 associated with a shopping domain may include a database of words commonly used when people discuss shopping.

A downstream process called entity resolution (discussed in detail elsewhere herein) links a slot of text data to a specific entity known to the system. To perform entity resolution, the NLU component 460 may utilize gazetteer information (784a-784n) stored in an entity library storage 782. The gazetteer information 784 may be used to match text data (representing a portion of the user input) with text data representing known entities, such as song titles, contact names, etc. Gazetteers 784 may be linked to users (e.g., a particular gazetteer may be associated with a specific user's music collection), may be linked to certain domains (e.g., a shopping domain, a music domain, a video domain, etc.), or may be organized in a variety of other ways.

Each recognizer 763 may also include an intent classification (IC) component 764. An IC component 764 parses text data to determine an intent(s) (associated with the domain associated with the recognizer 763 implementing the IC component 764) that potentially represents the user input. An intent represents to an action a user desires be performed. An IC component 764 may communicate with a database 774 of words linked to intents. For example, a music intent database may link words and phrases such as "quiet," "volume off," and "mute" to a <Mute> intent. An IC component 764 identifies potential intents by comparing words and phrases in text data (representing at least a portion of the user input) to the words and phrases in an intents database 774 (associated with the domain that is associated with the recognizer 763 implementing the IC component 764).

The intents identifiable by a specific IC component 764 are linked to domain-specific (i.e., the domain associated with the recognizer 763 implementing the IC component 764) grammar frameworks 776 with "slots" to be filled. Each slot of a grammar framework 776 corresponds to a portion of text data that the system believes corresponds to an entity. For example, a grammar framework 776 corresponding to a <PlayMusic> intent may correspond to text data sentence structures such as "Play {Artist Name}," "Play {Album Name}," "Play {Song name}," "Play {Song name} by {Artist Name}," etc. However, to make entity resolution more flexible, grammar frameworks 776 may not be structured as sentences, but rather based on associating slots with grammatical tags.

For example, an NER component 762 may parse text data to identify words as subject, object, verb, preposition, etc. based on grammar rules and/or models prior to recognizing named entities in the text data. An IC component 764 (implemented by the same recognizer 763 as the NER component 762) may use the identified verb to identify an intent. The NER component 762 may then determine a grammar model 776 associated with the identified intent. For example, a grammar model 776 for an intent corresponding to <PlayMusic> may specify a list of slots applicable to play the identified "object" and any object modifier (e.g., a prepositional phrase), such as {Artist Name}, {Album Name}, {Song name}, etc. The NER component 762 may then search corresponding fields in a lexicon 786 (associated with the domain associated with the recognizer 763 implementing the NER component 762), attempting to match words and phrases in text data the NER component 762 previously tagged as a grammatical object or object modifier with those identified in the lexicon 786.

An NER component 762 may perform semantic tagging, which is the labeling of a word or combination of words according to their type/semantic meaning. An NER component 762 may parse text data using heuristic grammar rules, or a model may be constructed using techniques such as Hidden Markov Models, maximum entropy models, log linear models, conditional random fields (CRF), and the like. For example, an NER component 762 implemented by a music domain recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 762 identifies "Play" as a verb based on a word database associated with the music domain, which an IC component 764 (also implemented by the music domain recognizer) may determine corresponds to a <PlayMusic> intent. At this stage, no determination has been made as to the meaning of "mother's little helper" or "the rolling stones," but based on grammar rules and models, the NER component 762 has determined the text of these phrases relates to the grammatical object (i.e., entity) of the user input represented in the text data.

An NER component 762 may tag text data to attribute meaning thereto. For example, an NER component 762 may tag "play mother's little helper by the rolling stones" as: {domain} Music, {intent}<PlayMusic>, {artist name} rolling stones, {media type} SONG, and {song title} mother's little helper. For further example, the NER component 762 may tag "play songs by the rolling stones" as: {domain} Music, {intent}<PlayMusic>, {artist name} rolling stones, and {media type} SONG.

The shortlister component 750 may receive ASR output data 810 output from the ASR component 450 or output from the device 110b (as illustrated in FIG. 8). The ASR component 450 may embed the ASR output data 810 into a form processable by a trained model(s) using sentence embedding techniques as known in the art. Sentence embedding results in the ASR output data 810 including text in a structure that enables the trained models of the shortlister component 850 to operate on the ASR output data 810. For example, an embedding of the ASR output data 810 may be a vector representation of the ASR output data 810.

The shortlister component 750 may make binary determinations (e.g., yes or no) regarding which domains relate to the ASR output data 810. The shortlister component 750 may make such determinations using the one or more trained models described herein above. If the shortlister component 750 implements a single trained model for each domain, the shortlister component 750 may simply run the models that are associated with enabled domains as indicated in a user profile associated with the device 110 and/or user that originated the user input.

The shortlister component 750 may generate n-best list data 815 representing domains that may execute with respect to the user input represented in the ASR output data 810. The size of the n-best list represented in the n-best list data 815 is configurable. In an example, the n-best list data 815 may indicate every domain of the system as well as contain an indication, for each domain, regarding whether the domain is likely capable to execute the user input represented in the ASR output data 810. In another example, instead of indicating every domain of the system, the n-best list data 815 may only indicate the domains that are likely to be able to execute the user input represented in the ASR output data 810. In yet another example, the shortlister component 750 may implement thresholding such that the n-best list data 815 may indicate no more than a maximum number of domains that may execute the user input represented in the ASR output data 810. In an example, the threshold number of domains that may be represented in the n-best list data 815 is ten. In another example, the domains included in the n-best list data 815 may be limited by a threshold a score, where only domains indicating a likelihood to handle the user input is above a certain score (as determined by processing the ASR output data 810 by the shortlister component 750 relative to such domains) are included in the n-best list data 815.

The ASR output data 810 may correspond to more than one ASR hypothesis. When this occurs, the shortlister component 750 may output a different n-best list (represented in the n-best list data 815) for each ASR hypothesis. Alternatively, the shortlister component 750 may output a single n-best list representing the domains that are related to the multiple ASR hypotheses represented in the ASR output data 810.

As indicated above, the shortlister component 750 may implement thresholding such that an n-best list output therefrom may include no more than a threshold number of entries. If the ASR output data 810 includes more than one ASR hypothesis, the n-best list output by the shortlister component 750 may include no more than a threshold number of entries irrespective of the number of ASR hypotheses output by the ASR component 450. Alternatively or in addition, the n-best list output by the shortlister component 750 may include no more than a threshold number of entries for each ASR hypothesis (e.g., no more than five entries for a first ASR hypothesis, no more than five entries for a second ASR hypothesis, etc.).

In addition to making a binary determination regarding whether a domain potentially relates to the ASR output data 810, the shortlister component 750 may generate confidence scores representing likelihoods that domains relate to the ASR output data 810. If the shortlister component 750 implements a different trained model for each domain, the shortlister component 750 may generate a different confidence score for each individual domain trained model that is run. If the shortlister component 750 runs the models of every domain when ASR output data 810 is received, the shortlister component 750 may generate a different confidence score for each domain of the system. If the shortlister component 750 runs the models of only the domains that are associated with skills indicated as enabled in a user profile associated with the device 110 and/or user that originated the user input, the shortlister component 750 may only generate a different confidence score for each domain associated with at least one enabled skill. If the shortlister component 750 implements a single trained model with domain specifically trained portions, the shortlister component 750 may generate a different confidence score for each domain who's specifically trained portion is run. The shortlister component 750 may perform matrix vector modification to obtain confidence scores for all domains of the system in a single instance of processing of the ASR output data 810.

N-best list data 815 including confidence scores that may be output by the shortlister component 750 may be represented as, for example:
Search domain, 0.67
Recipe domain, 0.62
Information domain, 0.57
Shopping domain, 0.42
As indicated, the confidence scores output by the shortlister component 750 may be numeric values. The confidence scores output by the shortlister component 750 may alternatively be binned values (e.g., high, medium, low).

The n-best list may only include entries for domains having a confidence score satisfying (e.g., equaling or exceeding) a minimum threshold confidence score. Alternatively, the shortlister component 750 may include entries for all domains associated with user enabled skills, even if one or more of the domains are associated with confidence scores that do not satisfy the minimum threshold confidence score.

The shortlister component 750 may consider other data 820 when determining which domains may relate to the user input represented in the ASR output data 810 as well as respective confidence scores. The other data 820 may include usage history data associated with the device 110 and/or user that originated the user input. For example, a confidence score of a domain may be increased if user inputs originated by the device 110 and/or user routinely invoke the domain. Conversely, a confidence score of a domain may be decreased if user inputs originated by the device 110 and/or user rarely invoke the domain. Thus, the other data 820 may include an indicator of the user associated with the ASR output data 810, for example as determined by a user recognition component.

The other data 820 may be character embedded prior to being input to the shortlister component 750. The other data 820 may alternatively be embedded using other techniques known in the art prior to being input to the shortlister component 750.

The other data 820 may also include data indicating the domains associated with skills that are enabled with respect to the device 110 and/or user that originated the user input. The shortlister component 750 may use such data to determine which domain-specific trained models to run. That is, the shortlister component 750 may determine to only run the trained models associated with domains that are associated with user-enabled skills. The shortlister component 750 may alternatively use such data to alter confidence scores of domains.

As an example, considering two domains, a first domain associated with at least one enabled skill and a second domain not associated with any user-enabled skills of the user that originated the user input, the shortlister component 750 may run a first model specific to the first domain as well as a second model specific to the second domain. Alternatively, the shortlister component 750 may run a model configured to determine a score for each of the first and second domains. The shortlister component 750 may determine a same confidence score for each of the first and second domains in the first instance. The shortlister component 750 may then alter those confidence scores based on which domains is associated with at least one skill enabled by the present user. For example, the shortlister component 750 may increase the confidence score associated with the domain associated with at least one enabled skill while leaving the confidence score associated with the other domain the same. Alternatively, the shortlister component 750 may leave the confidence score associated with the domain associated with at least one enabled skill the same while decreasing the confidence score associated with the other domain. Moreover, the shortlister component 750 may increase the confidence score associated with the domain associated with at least one enabled skill as well as decrease the confidence score associated with the other domain.

As indicated, a user profile may indicate which skills a corresponding user has enabled (e.g., authorized to execute using data associated with the user). Such indications may be stored in the profile storage 470. When the shortlister component 750 receives the ASR output data 810, the shortlister component 750 may determine whether profile data associated with the user and/or device 110 that originated the command includes an indication of enabled skills.

The other data 820 may also include data indicating the type of the device 110. The type of a device may indicate the output capabilities of the device. For example, a type of device may correspond to a device with a visual display, a headless (e.g., displayless) device, whether a device is mobile or stationary, whether a device includes audio playback capabilities, whether a device includes a camera, other device hardware configurations, etc. The shortlister component 750 may use such data to determine which domain-specific trained models to run. For example, if the device 110 corresponds to a displayless type device, the shortlister component 750 may determine not to run trained models specific to domains that output video data. The shortlister component 750 may alternatively use such data to alter confidence scores of domains.

As an example, considering two domains, one that outputs audio data and another that outputs video data, the shortlister component 750 may run a first model specific to the domain that generates audio data as well as a second model specific to the domain that generates video data. Alternatively, the shortlister component 750 may run a model configured to determine a score for each domain. The shortlister component 750 may determine a same confidence score for each of the domains in the first instance. The shortlister component 750 may then alter the original confidence scores based on the type of the device 110 that originated the user input corresponding to the ASR output data 810. For example, if the device 110 is a displayless device, the shortlister component 750 may increase the confidence score associated with the domain that generates audio data while leaving the confidence score associated with the domain that generates video data the same. Alternatively, if the device 110 is a displayless device, the shortlister component 750 may leave the confidence score associated with the domain that generates audio data the same while decreasing the confidence score associated with the domain that generates video data. Moreover, if the device 110 is a displayless device, the shortlister component 750 may increase the confidence score associated with the domain that generates audio data as well as decrease the confidence score associated with the domain that generates video data.

The type of device information represented in the other data 820 may represent output capabilities of the device to be used to output content to the user, which may not necessarily be the user input originating device. For example, a user may input a spoken user input corresponding to "play Game of Thrones" to a device not including a display. The system may determine a smart TV or other display device (associated with the same user profile) for outputting Game of Thrones. Thus, the other data 820 may represent the smart TV of other display device, and not the displayless device that captured the spoken user input.

The other data 820 may also include data indicating the user input originating device's speed, location, or other mobility information. For example, the device may correspond to a vehicle including a display. If the vehicle is moving, the shortlister component 750 may decrease the confidence score associated with a domain that generates video data as it may be undesirable to output video content to a user while the user is driving. The device may output data to the system(s) 120 indicating when the device is moving.

The other data 820 may also include data indicating a currently invoked domain. For example, a user may speak a first (e.g., a previous) user input causing the system to invoke a music domain skill to output music to the user. As the system is outputting music to the user, the system may receive a second (e.g., the current) user input. The shortlister component 750 may use such data to alter confidence scores of domains. For example, the shortlister component 750 may run a first model specific to a first domain as well as a second model specific to a second domain. Alternatively, the shortlister component 750 may run a model configured to determine a score for each domain. The shortlister component 750 may also determine a same confidence score for each of the domains in the first instance. The shortlister component 750 may then alter the original confidence scores based on the first domain being invoked to cause the system to output content while the current user input was received. Based on the first domain being invoked, the shortlister component 750 may (i) increase the confidence score associated with the first domain while leaving the confidence score associated with the second domain the same, (ii) leave the confidence score associated with the first domain the same while decreasing the confidence score associated with the second domain, or (iii) increase the confidence score associated with the first domain as well as decrease the confidence score associated with the second domain.

The thresholding implemented with respect to the n-best list data 815 generated by the shortlister component 750 as well as the different types of other data 820 considered by the shortlister component 750 are configurable. For example, the shortlister component 750 may update confidence scores as more other data 820 is considered. For further example, the n-best list data 815 may exclude relevant domains if thresholding is implemented. Thus, for example, the shortlister component 750 may include an indication of a domain in the n-best list 815 unless the shortlister component 750 is one hundred percent confident that the domain may not execute the user input represented in the ASR output data 810 (e.g., the shortlister component 750 determines a confidence score of zero for the domain).

The shortlister component 750 may send the ASR output data 810 to recognizers 763 associated with domains represented in the n-best list data 815. Alternatively, the shortlister component 750 may send the n-best list data 815 or some other indicator of the selected subset of domains to another component (such as the orchestrator component 430) which may in turn send the ASR output data 810 to the recognizers 763 corresponding to the domains included in the n-best list data 815 or otherwise indicated in the indicator. If the shortlister component 750 generates an n-best list representing domains without any associated confidence scores, the shortlister component 750/orchestrator component 430 may send the ASR output data 810 to recognizers 763 associated with domains that the shortlister component 750 determines may execute the user input. If the shortlister component 750 generates an n-best list representing domains with associated confidence scores, the shortlister component 750/orchestrator component 430 may send the ASR output data 810 to recognizers 763 associated with domains associated with confidence scores satisfying (e.g., meeting or exceeding) a threshold minimum confidence score.

A recognizer 763 may output tagged text data generated by an NER component 762 and an IC component 764, as described herein above. The NLU component 460 may compile the output tagged text data of the recognizers 763 into a single cross-domain n-best list 840 and may send the cross-domain n-best list 840 to a pruning component 850. Each entry of tagged text (e.g., each NLU hypothesis) represented in the cross-domain n-best list data 840 may be associated with a respective score indicating a likelihood that the NLU hypothesis corresponds to the domain associated with the recognizer 763 from which the NLU hypothesis was output. For example, the cross-domain n-best list data 840 may be represented as (with each line corresponding to a different NLU hypothesis):

[0.95] Intent: <PlayMusic> ArtistName: Beethoven SongName: Waldstein Sonata
[0.70] Intent: <PlayVideo> ArtistName: Beethoven VideoName: Waldstein Sonata
[0.01] Intent: <PlayMusic> ArtistName: Beethoven AlbumName: Waldstein Sonata
[0.01] Intent: <PlayMusic> SongName: Waldstein Sonata The pruning component 850 may sort the NLU hypotheses represented in the cross-domain n-best list data 840 according to their respective scores. The pruning component 850 may perform score thresholding with respect to the cross-domain NLU hypotheses. For example, the pruning component 850 may select NLU hypotheses associated with scores satisfying (e.g., meeting and/or exceeding) a threshold score. The pruning component 850 may also or alternatively perform number of NLU hypothesis thresholding. For example, the pruning component 850 may select the top scoring NLU hypothesis(es). The pruning component 850 may output a portion of the NLU hypotheses input thereto. The purpose of the pruning component 850 is to create a reduced list of NLU hypotheses so that downstream, more resource intensive, processes may only operate on the NLU hypotheses that most likely represent the user's intent.

The NLU component 460 may include a light slot filler component 852. The light slot filler component 852 can take text from slots represented in the NLU hypotheses output by the pruning component 850 and alter them to make the text more easily processed by downstream components. The light slot filler component 852 may perform low latency operations that do not involve heavy operations such as reference to a knowledge base (e.g., 772. The purpose of the light slot filler component 852 is to replace words with other words or values that may be more easily understood by downstream components. For example, if a NLU hypothesis includes the word "tomorrow," the light slot filler component 852 may replace the word "tomorrow" with an actual date for purposes of downstream processing. Similarly, the light slot filler component 852 may replace the word "CD" with "album" or the words "compact disc." The replaced words are then included in the cross-domain n-best list data 860.

The cross-domain n-best list data 860 may be input to an entity resolution component 870. The entity resolution component 870 can apply rules or other instructions to standardize labels or tokens from previous stages into an intent/slot representation. The precise transformation may depend on the domain. For example, for a travel domain, the entity resolution component 870 may transform text corresponding to "Boston airport" to the standard BOS three-letter code referring to the airport. The entity resolution component 870 can refer to a knowledge base (e.g., 772) that is used to specifically identify the precise entity referred to in each slot of each NLU hypothesis represented in the cross-domain n-best list data 860. Specific intent/slot combinations may also be tied to a particular source, which may then be used to resolve the text. In the example "play songs by the stones," the entity resolution component 870 may reference a personal music catalog, Amazon Music account, a user profile, or the like. The entity resolution component 870 may output an altered n-best list that is based on the cross-domain n-best list 860 but that includes more detailed information (e.g., entity IDs) about the specific entities mentioned in the slots and/or more detailed slot data that can eventually be used by a skill. The NLU component 460 may include multiple entity resolution components 870 and each entity resolution component 870 may be specific to one or more domains.

The NLU component 460 may include a reranker 890. The reranker 890 may assign a particular confidence score to each NLU hypothesis input therein. The confidence score of a particular NLU hypothesis may be affected by whether the NLU hypothesis has unfilled slots. For example, if a NLU hypothesis includes slots that are all filled/resolved, that NLU hypothesis may be assigned a higher confidence score than another NLU hypothesis including at least some slots that are unfilled/unresolved by the entity resolution component 870.

The reranker 890 may apply re-scoring, biasing, or other techniques. The reranker 890 may consider not only the data output by the entity resolution component 870, but may also consider other data 891. The other data 891 may include a variety of information. For example, the other data 891 may include skill rating or popularity data. For example, if one skill has a high rating, the reranker 890 may increase the score of a NLU hypothesis that may be processed by the skill. The other data 891 may also include information about skills that have been enabled by the user that originated the user input. For example, the reranker 890 may assign higher scores to NLU hypothesis that may be processed by enabled skills than NLU hypothesis that may be processed by non-enabled skills. The other data 891 may also include data indicating user usage history, such as if the user that originated the user input regularly uses a particular skill or does so at particular times of day. The other data 891 may additionally include data indicating date, time, location, weather, type of device 110, user identifier, context, as well as other information. For example, the reranker 890 may consider when any particular skill is currently active (e.g., music being played, a game being played, etc.).

As illustrated and described, the entity resolution component 870 is implemented prior to the reranker 890. The entity resolution component 870 may alternatively be implemented after the reranker 890. Implementing the entity resolution component 870 after the reranker 890 limits the NLU hypotheses processed by the entity resolution component 870 to only those hypotheses that successfully pass through the reranker 890.

The reranker 890 may be a global reranker (e.g., one that is not specific to any particular domain). Alternatively, the NLU component 460 may implement one or more domain-specific rerankers. Each domain-specific reranker may rerank NLU hypotheses associated with the domain. Each domain-specific reranker may output an n-best list of reranked hypotheses (e.g., 5-10 hypotheses).

The NLU component 460 may perform NLU processing described above with respect to domains associated with skills wholly implemented as part of the system(s) 120 (e.g., designated 490 in FIG. 4). The NLU component 460 may separately perform NLU processing described above with respect to domains associated with skills that are at least partially implemented as part of the skill system(s) 125. In an example, the shortlister component 750 may only process with respect to these latter domains. Results of these two NLU processing paths may be merged into NLU output data 885, which may be sent to a post-NLU ranker 465, which may be implemented by the system(s) 120.

The post-NLU ranker 465 may include a statistical component that produces a ranked list of intent/skill pairs with associated confidence scores. Each confidence score may indicate an adequacy of the skill's execution of the intent with respect to NLU results data associated with the skill. The post-NLU ranker 465 may operate one or more trained models configured to process the NLU results data 885, skill result data 830, and the other data 820 in order to output ranked output data 825. The ranked output data 825 may include an n-best list where the NLU hypotheses in the NLU results data 885 are reordered such that the n-best list in the ranked output data 825 represents a prioritized list of skills to respond to a user input as determined by the post-NLU ranker 465. The ranked output data 825 may also include (either as part of an n-best list or otherwise) individual respective scores corresponding to skills where each score indicates a probability that the skill (and/or its respective result data) corresponds to the user input.

The system may be configured with thousands, tens of thousands, etc. skills. The post-NLU ranker 465 enables the system to better determine the best skill to execute the user input. For example, first and second NLU hypotheses in the NLU results data 885 may substantially correspond to each other (e.g., their scores may be significantly similar), even though the first NLU hypothesis may be processed by a first skill and the second NLU hypothesis may be processed by a second skill. The first NLU hypothesis may be associated with a first confidence score indicating the system's confidence with respect to NLU processing performed to generate the first NLU hypothesis. Moreover, the second NLU hypothesis may be associated with a second confidence score indicating the system's confidence with respect to NLU processing performed to generate the second NLU hypothesis. The first confidence score may be similar or identical to the second confidence score. The first confidence score and/or the second confidence score may be a numeric value (e.g., from 0.0 to 1.0). Alternatively, the first confidence score and/or the second confidence score may be a binned value (e.g., low, medium, high).

The post-NLU ranker 465 (or other scheduling component such as orchestrator component 430) may solicit the first skill and the second skill to provide potential result data 830 based on the first NLU hypothesis and the second NLU hypothesis, respectively. For example, the post-NLU ranker 465 may send the first NLU hypothesis to the first skill 490a along with a request for the first skill 490a to at least partially execute with respect to the first NLU hypothesis. The post-NLU ranker 465 may also send the second NLU hypothesis to the second skill 490b along with a request for the second skill 490b to at least partially execute with respect to the second NLU hypothesis. The post-NLU ranker 465 receives, from the first skill 490a, first result data 830a generated from the first skill 490a's execution with respect to the first NLU hypothesis. The post-NLU ranker 465 also receives, from the second skill 490b, second results data 830b generated from the second skill 490b's execution with respect to the second NLU hypothesis.

The result data 830 may include various portions. For example, the result data 830 may include content (e.g., audio data, text data, and/or video data) to be output to a user. The result data 830 may also include a unique identifier used by the system(s) 120 and/or the skill system(s) 125 to locate the data to be output to a user. The result data 830 may also include an instruction. For example, if the user input corresponds to "turn on the light," the result data 830 may include an instruction causing the system to turn on a light associated with a profile of the device (110a/110b) and/or user.

The post-NLU ranker 465 may consider the first result data 830a and the second result data 830b to alter the first confidence score and the second confidence score of the first NLU hypothesis and the second NLU hypothesis, respectively. That is, the post-NLU ranker 465 may generate a third confidence score based on the first result data 830a and the first confidence score. The third confidence score may correspond to how likely the post-NLU ranker 465 determines the first skill will correctly respond to the user input. The post-NLU ranker 465 may also generate a fourth confidence score based on the second result data 830b and the second confidence score. One skilled in the art will appreciate that a first difference between the third confidence score and the fourth confidence score may be greater than a second difference between the first confidence score and the second confidence score. The post-NLU ranker 465 may also consider the other data 820 to generate the third confidence score and the fourth confidence score. While it has been described that the post-NLU ranker 465 may alter the confidence scores associated with first and second NLU hypotheses, one skilled in the art will appreciate that the post-NLU ranker 465 may alter the confidence scores of more than two NLU hypotheses. The post-NLU ranker 465 may select the result data 830 associated with the skill 490 with the highest altered confidence score to be the data output in response to the current user input. The post-NLU ranker 465 may also consider the ASR output data 810 to alter the NLU hypotheses confidence scores.

The orchestrator component 430 may, prior to sending the NLU results data 885 to the post-NLU ranker 465, associate intents in the NLU hypotheses with skills 490. For example, if a NLU hypothesis includes a <PlayMusic> intent, the orchestrator component 430 may associate the NLU hypothesis with one or more skills 490 that can execute the <PlayMusic> intent. Thus, the orchestrator component 430 may send the NLU results data 885, including NLU hypotheses paired with skills 490, to the post-NLU ranker 465. In response to ASR output data 810 corresponding to "what should I do for dinner today," the orchestrator component 430 may generates pairs of skills 490 with associated NLU hypotheses corresponding to:

Skill 1/NLU hypothesis including <Help> intent
Skill 2/NLU hypothesis including <Order> intent
Skill 3/NLU hypothesis including <DishType> intent The post-NLU ranker 465 queries each skill 490, paired with a NLU hypothesis in the NLU output data 885, to provide result data 830 based on the NLU hypothesis with which it is associated. That is, with respect to each skill, the post-NLU ranker 465 colloquially asks the each skill "if given this NLU hypothesis, what would you do with it." According to the above example, the post-NLU ranker 465 may send skills 490 the following data:

Skill 1: First NLU hypothesis including <Help> intent indicator

Skill 2: Second NLU hypothesis including <Order> intent indicator

Skill 3: Third NLU hypothesis including <DishType> intent indicator

The post-NLU ranker 465 may query each of the skills 490 in parallel or substantially in parallel.

A skill 490 may provide the post-NLU ranker 465 with various data and indications in response to the post-NLU ranker 465 soliciting the skill 490 for result data 830. A skill 490 may simply provide the post-NLU ranker 465 with an indication of whether or not the skill can execute with respect to the NLU hypothesis it received. A skill 490 may also or alternatively provide the post-NLU ranker 465 with output data generated based on the NLU hypothesis it received. In some situations, a skill 490 may need further information in addition to what is represented in the received NLU hypothesis to provide output data responsive to the user input. In these situations, the skill 490 may provide the post-NLU ranker 465 with result data 830 indicating slots of a framework that the skill 490 further needs filled or entities that the skill 490 further needs resolved prior to the skill 490 being able to provided result data 830 responsive to the user input. The skill 490 may also provide the post-NLU ranker 465 with an instruction and/or computer-generated speech indicating how the skill 490 recommends the system solicit further information needed by the skill 490. The skill 490 may further provide the post-NLU ranker 465 with an indication of whether the skill 490 will have all needed information after the user provides additional information a single time, or whether the skill 490 will need the user to provide various kinds of additional information prior to the skill 490 having all needed information. According to the above example, skills 490 may provide the post-NLU ranker 465 with the following:

Skill 1: indication representing the skill can execute with respect to a NLU hypothesis including the <Help> intent indicator Skill 2: indication representing the skill needs to the system to obtain further information Skill 3: indication representing the skill can provide numerous results in response to the third NLU hypothesis including the <DishType> intent indicator Result data 830 includes an indication provided by a skill 490 indicating whether or not the skill 490 can execute with respect to a NLU hypothesis; data generated by a skill 490 based on a NLU hypothesis; as well as an indication provided by a skill 490 indicating the skill 490 needs further information in addition to what is represented in the received NLU hypothesis.

The post-NLU ranker 465 uses the result data 830 provided by the skills 490 to alter the NLU processing confidence scores generated by the reranker 890. That is, the post-NLU ranker 465 uses the result data 830 provided by the queried skills 490 to create larger differences between the NLU processing confidence scores generated by the reranker 890. Without the post-NLU ranker 465, the system may not be confident enough to determine an output in response to a user input, for example when the NLU hypotheses associated with multiple skills are too close for the system to confidently determine a single skill 490 to invoke to respond to the user input. For example, if the system does not implement the post-NLU ranker 465, the system may not be able to determine whether to obtain output data from a general reference information skill or a medical information skill in response to a user input corresponding to "what is acne."

The post-NLU ranker 465 may prefer skills 490 that provide result data 830 responsive to NLU hypotheses over skills 490 that provide result data 830 corresponding to an indication that further information is needed, as well as skills 490 that provide result data 830 indicating they can provide multiple responses to received NLU hypotheses. For example, the post-NLU ranker 465 may generate a first score for a first skill 490a that is greater than the first skill's NLU confidence score based on the first skill 490a providing result data 830a including a response to a NLU hypothesis. For further example, the post-NLU ranker 465 may generate a second score for a second skill 490b that is less than the second skill's NLU confidence score based on the second skill 490b providing result data 830b indicating further information is needed for the second skill 490b to provide a response to a NLU hypothesis. Yet further, for example, the post-NLU ranker 465 may generate a third score for a third skill 490c that is less than the third skill's NLU confidence score based on the third skill 490c providing result data 830c indicating the third skill 490c can provide multiple responses to a NLU hypothesis.

The post-NLU ranker 465 may consider other data 820 in determining scores. The other data 820 may include rankings associated with the queried skills 490. A ranking may be a system ranking or a user-specific ranking. A ranking may indicate a veracity of a skill from the perspective of one or more users of the system. For example, the post-NLU ranker 465 may generate a first score for a first skill 490a that is greater than the first skill's NLU processing confidence score based on the first skill 490a being associated with a high ranking. For further example, the post-NLU ranker 465 may generate a second score for a second skill 490b that is less than the second skill's NLU processing confidence score based on the second skill 490b being associated with a low ranking.

The other data 820 may include information indicating whether or not the user that originated the user input has enabled one or more of the queried skills 490. For example, the post-NLU ranker 465 may generate a first score for a first skill 490a that is greater than the first skill's NLU processing confidence score based on the first skill 490a being enabled by the user that originated the user input. For further example, the post-NLU ranker 465 may generate a second score for a second skill 490b that is less than the second skill's NLU processing confidence score based on the second skill 490b not being enabled by the user that originated the user input. When the post-NLU ranker 465 receives the NLU results data 885, the post-NLU ranker 465 may determine whether profile data, associated with the user and/or device that originated the user input, includes indications of enabled skills.

The other data 820 may include information indicating output capabilities of a device that will be used to output content, responsive to the user input, to the user. The system may include devices that include speakers but not displays, devices that include displays but not speakers, and devices that include speakers and displays. If the device that will output content responsive to the user input includes one or more speakers but not a display, the post-NLU ranker 465 may increase the NLU processing confidence score associated with a first skill configured to output audio data and/or decrease the NLU processing confidence score associated with a second skill configured to output visual data (e.g., image data and/or video data). If the device that will output content responsive to the user input includes a display but not one or more speakers, the post-NLU ranker 465 may increase the NLU processing confidence score associated with a first skill configured to output visual data and/or decrease the NLU processing confidence score associated with a second skill configured to output audio data.

The other data 820 may include information indicating the veracity of the result data 830 provided by a skill 490. For example, if a user says "tell me a recipe for pasta sauce," a first skill 490a may provide the post-NLU ranker 465 with first result data 830a corresponding to a first recipe associated with a five star rating and a second skill 490b may provide the post-NLU ranker 465 with second result data 830b corresponding to a second recipe associated with a one star rating. In this situation, the post-NLU ranker 465 may increase the NLU processing confidence score associated with the first skill 490a based on the first skill 490a providing the first result data 830a associated with the five star rating and/or decrease the NLU processing confidence score associated with the second skill 490b based on the second skill 490b providing the second result data 830b associated with the one star rating.

The other data 820 may include information indicating the type of device that originated the user input. For example, the device may correspond to a "hotel room" type if the device is located in a hotel room. If a user inputs a command corresponding to "order me food" to the device located in the hotel room, the post-NLU ranker 465 may increase the NLU processing confidence score associated with a first skill 490a corresponding to a room service skill associated with the hotel and/or decrease the NLU processing confidence score associated with a second skill 490b corresponding to a food skill not associated with the hotel.

The other data 820 may include information indicating a location of the device and/or user that originated the user input. The system may be configured with skills 490 that may only operate with respect to certain geographic locations. For example, a user may provide a user input corresponding to "when is the next train to Portland." A first skill 490a may operate with respect to trains that arrive at, depart from, and pass through Portland, Oreg. A second skill 490b may operate with respect to trains that arrive at, depart from, and pass through Portland, Me. If the device and/or user that originated the user input is located in Seattle, Wash., the post-NLU ranker 465 may increase the NLU processing confidence score associated with the first skill 490a and/or decrease the NLU processing confidence score associated with the second skill 490b. Likewise, if the device and/or user that originated the user input is located in Boston, Mass., the post-NLU ranker 465 may increase the NLU processing confidence score associated with the second skill 490b and/or decrease the NLU processing confidence score associated with the first skill 490a.

The other data 820 may include information indicating a time of day. The system may be configured with skills 490 that operate with respect to certain times of day. For example, a user may provide a user input corresponding to "order me food." A first skill 490a may generate first result data 830a corresponding to breakfast. A second skill 490b may generate second result data 830b corresponding to dinner. If the system(s) 120 receives the user input in the morning, the post-NLU ranker 465 may increase the NLU processing confidence score associated with the first skill 490a and/or decrease the NLU processing score associated with the second skill 490b. If the system(s) 120 receives the user input in the afternoon or evening, the post-NLU ranker 465 may increase the NLU processing confidence score associated with the second skill 490b and/or decrease the NLU processing confidence score associated with the first skill 490a.

The other data 820 may include information indicating user preferences. The system may include multiple skills 490 configured to execute in substantially the same manner. For example, a first skill 490a and a second skill 490b may both be configured to order food from respective restaurants. The system may store a user preference (e.g., in the profile storage 470) that is associated with the user that provided the user input to the system(s) 120 as well as indicates the user prefers the first skill 490a over the second skill 490b. Thus, when the user provides a user input that may be executed by both the first skill 490a and the second skill 490b, the post-NLU ranker 465 may increase the NLU processing confidence score associated with the first skill 490a and/or decrease the NLU processing confidence score associated with the second skill 490b.

The other data 820 may include information indicating system usage history associated with the user that originated the user input. For example, the system usage history may indicate the user originates user inputs that invoke a first skill 490a more often than the user originates user inputs that invoke a second skill 490b. Based on this, if the present user input may be executed by both the first skill 490a and the second skill 490b, the post-NLU ranker 465 may increase the NLU processing confidence score associated with the first skill 490a and/or decrease the NLU processing confidence score associated with the second skill 490b.

The other data 820 may include information indicating a speed at which the device 110 that originated the user input is traveling. For example, the device 110 may be located in a moving vehicle, or may be a moving vehicle. When a device 110 is in motion, the system may prefer audio outputs rather than visual outputs to decrease the likelihood of distracting the user (e.g., a driver of a vehicle). Thus, for example, if the device 110 that originated the user input is moving at or above a threshold speed (e.g., a speed above an average user's walking speed), the post-NLU ranker 465 may increase the NLU processing confidence score associated with a first skill 490a that generates audio data. The post-NLU ranker 465 may also or alternatively decrease the NLU processing confidence score associated with a second skill 490b that generates image data or video data.

The other data 820 may include information indicating how long it took a skill 490 to provide result data 830 to the post-NLU ranker 465. When the post-NLU ranker 465 multiple skills 490 for result data 830, the skills 490 may respond to the queries at different speeds. The post-NLU ranker 465 may implement a latency budget. For example, if the post-NLU ranker 465 determines a skill 490 responds to the post-NLU ranker 465 within a threshold amount of time from receiving a query from the post-NLU ranker 465, the post-NLU ranker 465 may increase the NLU processing confidence score associated with the skill 490. Conversely, if the post-NLU ranker 465 determines a skill 490 does not respond to the post-NLU ranker 465 within a threshold amount of time from receiving a query from the post-NLU ranker 465, the post-NLU ranker 465 may decrease the NLU processing confidence score associated with the skill 490.

It has been described that the post-NLU ranker 465 uses the other data 820 to increase and decrease NLU processing confidence scores associated with various skills 490 that the post-NLU ranker 465 has already requested result data from. Alternatively, the post-NLU ranker 465 may use the other data 820 to determine which skills 490 to request result data from. For example, the post-NLU ranker 465 may use the other data 820 to increase and/or decrease NLU processing confidence scores associated with skills 490 associated with the NLU results data 885 output by the NLU component 460. The post-NLU ranker 465 may select n-number of top scoring altered NLU processing confidence scores. The post-NLU ranker 465 may then request result data 830 from only the skills 490 associated with the selected n-number of NLU processing confidence scores.

As described, the post-NLU ranker 465 may request result data 830 from all skills 490 associated with the NLU results data 885 output by the NLU component 460. Alternatively, the system(s) 120 may prefer result data 830 from skills implemented entirely by the system(s) 120 rather than skills at least partially implemented by the skill system(s) 125. Therefore, in the first instance, the post-NLU ranker 465 may request result data 830 from only skills associated with the NLU results data 885 and entirely implemented by the system(s) 120. The post-NLU ranker 465 may only request result data 830 from skills associated with the NLU results data 885, and at least partially implemented by the skill system(s) 125, if none of the skills, wholly implemented by the system(s) 120, provide the post-NLU ranker 465 with result data 830 indicating either data response to the NLU results data 885, an indication that the skill can execute the user input, or an indication that further information is needed.

As indicated above, the post-NLU ranker 465 may request result data 830 from multiple skills 490. If one of the skills 490 provides result data 830 indicating a response to a NLU hypothesis and the other skills provide result data 830 indicating either they cannot execute or they need further information, the post-NLU ranker 465 may select the result data 830 including the response to the NLU hypothesis as the data to be output to the user. If more than one of the skills 490 provides result data 830 indicating responses to NLU hypotheses, the post-NLU ranker 465 may consider the other data 820 to generate altered NLU processing confidence scores, and select the result data 830 of the skill associated with the greatest score as the data to be output to the user.

A system that does not implement the post-NLU ranker 465 may select the highest scored NLU hypothesis in the NLU results data 885. The system may send the NLU hypothesis to a skill 490 associated therewith along with a request for output data. In some situations, the skill 490 may not be able to provide the system with output data. This results in the system indicating to the user that the user input could not be processed even though another skill associated with lower ranked NLU hypothesis could have provided output data responsive to the user input.

The post-NLU ranker 465 reduces instances of the aforementioned situation. As described, the post-NLU ranker 465 queries multiple skills associated with the NLU results data 885 to provide result data 830 to the post-NLU ranker 465 prior to the post-NLU ranker 465 ultimately determining the skill 490 to be invoked to respond to the user input. Some of the skills 490 may provide result data 830 indicating responses to NLU hypotheses while other skills 490 may providing result data 830 indicating the skills cannot provide responsive data. Whereas a system not implementing the post-NLU ranker 465 may select one of the skills 490 that could not provide a response, the post-NLU ranker 465 only selects a skill 490 that provides the post-NLU ranker 465 with result data corresponding to a response, indicating further information is needed, or indicating multiple responses can be generated.

The post-NLU ranker 465 may select result data 830, associated with the skill 490 associated with the highest score, for output to the user. Alternatively, the post-NLU ranker 465 may output ranked output data 825 indicating skills 490 and their respective post-NLU ranker rankings. Since the post-NLU ranker 465 receives result data 830, potentially corresponding to a response to the user input, from the skills 490 prior to post-NLU ranker 465 selecting one of the skills or outputting the ranked output data 825, little to no latency occurs from the time skills provide result data 830 and the time the system outputs responds to the user.

If the post-NLU ranker 465 selects result audio data to be output to a user and the system determines content should be output audibly, the post-NLU ranker 465 (or another component of the system(s) 120) may cause the device 110a and/or the device 110b to output audio corresponding to the result audio data. If the post-NLU ranker 465 selects result text data to output to a user and the system determines content should be output visually, the post-NLU ranker 465 (or another component of the system(s) 120) may cause the device 110b to display text corresponding to the result text data. If the post-NLU ranker 465 selects result audio data to output to a user and the system determines content should be output visually, the post-NLU ranker 465 (or another component of the system(s) 120) may send the result audio data to the ASR component 450. The ASR component 450 may generate output text data corresponding to the result audio data. The system(s) 120 may then cause the device 110b to display text corresponding to the output text data. If the post-NLU ranker 465 selects result text data to output to a user and the system determines content should be output audibly, the post-NLU ranker 465 (or another component of the system(s) 120) may send the result text data to the TTS component 480. The TTS component 480 may generate output audio data (corresponding to computer-generated speech) based on the result text data. The system(s) 120 may then cause the device 110a and/or the device 110b to output audio corresponding to the output audio data.

As described, a skill 490 may provide result data 830 either indicating a response to the user input, indicating more information is needed for the skill 490 to provide a response to the user input, or indicating the skill 490 cannot provide a response to the user input. If the skill 490 associated with the highest post-NLU ranker score provides the post-NLU ranker 465 with result data 830 indicating a response to the user input, the post-NLU ranker 465 (or another component of the system(s) 120, such as the orchestrator component 430) may simply cause content corresponding to the result data 830 to be output to the user. For example, the post-NLU ranker 465 may send the result data 830 to the orchestrator component 430. The orchestrator component 430 may cause the result data 830 to be sent to the device (110a/110b), which may output audio and/or display text corresponding to the result data 830. The orchestrator component 430 may send the result data 830 to the ASR component 450 to generate output text data and/or may send the result data 830 to the TTS component 480 to generate output audio data, depending on the situation.

The skill 490 associated with the highest post-NLU ranker score may provide the post-NLU ranker 465 with result data 830 indicating more information is needed as well as instruction data. The instruction data may indicate how the skill 490 recommends the system obtain the needed information. For example, the instruction data may correspond to text data or audio data (i.e., computer-generated speech) corresponding to "please indicate _____." The instruction data may be in a format (e.g., text data or audio data) capable of being output by the device (110a/110b). When this occurs, the post-NLU ranker 465 may simply cause the received instruction data be output by the device (110a/110b). Alternatively, the instruction data may be in a format that is not capable of being output by the device (110a/110b). When this occurs, the post-NLU ranker 465 may cause the ASR component 450 or the TTS component 480 to process the instruction data, depending on the situation, to generate instruction data that may be output by the device (110a/110b). Once the user provides the system with all further information needed by the skill 490, the skill 490 may provide the system with result data 830 indicating a response to the user input, which may be output by the system as detailed above.

The system may include "informational" skills 490 that simply provide the system with information, which the system outputs to the user. The system may also include "transactional" skills 490 that require a system instruction to execute the user input. Transactional skills 490 include ride sharing skills, flight booking skills, etc. A transactional skill 490 may simply provide the post-NLU ranker 465 with result data 830 indicating the transactional skill 490 can execute the user input. The post-NLU ranker 465 may then cause the system to solicit the user for an indication that the system is permitted to cause the transactional skill 490 to execute the user input. The user-provided indication may be an audible indication or a tactile indication (e.g., activation of a virtual button or input of text via a virtual keyboard). In response to receiving the user-provided indication, the system may provide the transactional skill 490 with data corresponding to the indication. In response, the transactional skill 490 may execute the command (e.g., book a flight, book a train ticket, etc.). Thus, while the system may not further engage an informational skill 490 after the informational skill 490 provides the post-NLU ranker 465 with result data 830, the system may further engage a transactional skill 490 after the transactional skill 490 provides the post-NLU ranker 465 with result data 830 indicating the transactional skill 490 may execute the user input.

In some instances, the post-NLU ranker 465 may generate respective scores for first and second skills that are too close (e.g., are not different by at least a threshold difference) for the post-NLU ranker 465 to make a confident determination regarding which skill should execute the user input. When this occurs, the system may request the user indicate which skill the user prefers to execute the user input. The system may output TTS-generated speech to the user to solicit which skill the user wants to execute the user input.

Figure 9:
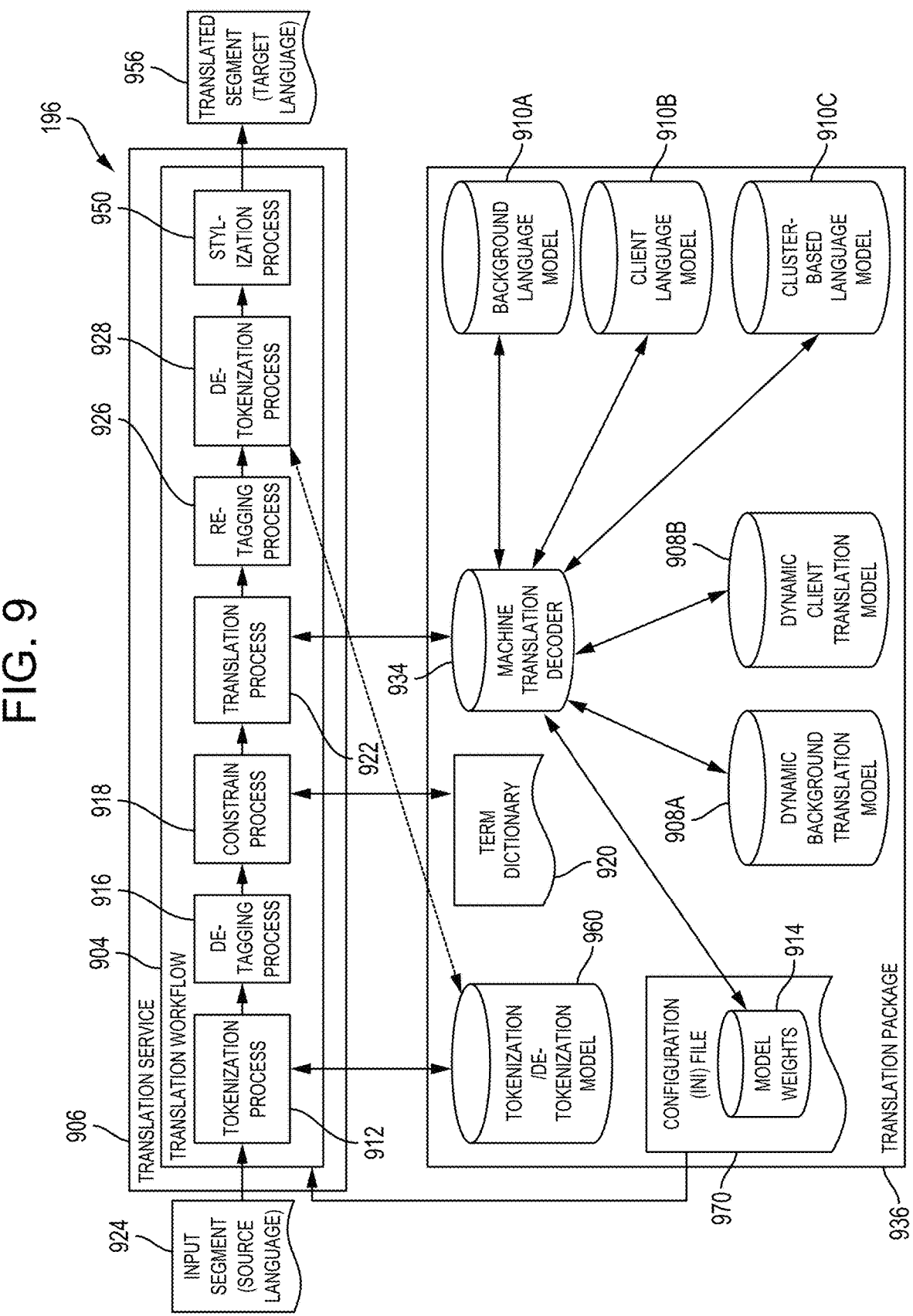
FIG. 9 is a block diagram illustrating components of a machine translation (MT) engine that may be employed with some embodiments of the present disclosure.

FIG. 9 is a system architecture diagram showing aspects of a machine translation (MT) engine 196 that can be used to translate input segments 924 of text into output segments 956 of text using translation models 908 and language models 910, according to one configuration disclosed herein. As shown, the MT engine 196 may include a translation service 906 and a translation package 936. The translation package 936 may include a background language model 910A, a client language model 910B, and a cluster-based language model 910C. A combined language model (not shown in FIG. 9) can additionally or alternatively be utilized in some configurations.

The translation package 936 may also include a dynamic background translation model 908A and a dynamic client translation model 908B. A combined translation model (not shown in FIG. 9) can additionally or alternatively be utilized in some configurations. The translation package 936 can further include a configuration file 970 that includes model weights 914. The configuration file 970 might also specify other preferences regarding the manner in which translations are to be performed.

In some configurations, the translation package 936 also includes a tokenization/de-tokenization model 960. The tokenization/de-tokenization model 960 can be generated by a tokenization process and utilized at translation time to tokenize and/or de-tokenize an input segment 924 that is to be translated. The translation package 936 can also include a term dictionary 920 that includes translations for client-specific words or phrases. The term dictionary 920 can be utilized to ensure that specified words or phrases are translated in the same manner regardless of the context within which they appear.

The illustrated translation package 936 also includes a machine translation decoder 934. In one particular configuration, the machine translation decoder 934 is the MOSES open-source statistical machine translation system. Other statistical machine translation decoders can be utilized in other configurations. The configuration file 970 can include data for configuring the machine translation decoder 934 in various ways. Additional details regarding the MOSES open-source statistical machine translation system can be found at http://www.statmt.org/moses/.

As shown in FIG. 9 and described briefly above, the translation service 906 can utilize the translation package 936 when translating an input segment 924 in a source language to a translated segment 956 in a target language. In particular, the translation service 906 is configured in some implementations to implement a translation workflow 904 in order to perform the translation. The configuration file 970 can include data that specifies various aspects regarding the operation of the translation workflow 904.

As shown, the translation workflow 904 begins with the tokenization process 912. The tokenization process 912 tokenizes the input segment 924 by breaking the text into discrete units. For example, and without limitation, the tokenization process 912 can separate punctuation characters, perform normalization on the text, and break apart contractions.

The tokenization process 912 provides the tokenized input segment 924 to the de-tagging process 916. The de-tagging process 904 removes any markup tags (e.g. HTML tags) that appear in the input segment 924. As will be described in greater detail below, the removed markup tags can be added to the translated segment 956 by the re-tagging process 926. In this manner, formatting contained in the input segment 924 can be preserved in the translated segment 956.

The tokenized and de-tagged input segment 924 is provided to the constrain process 918 in one configuration. The constrain process 918 utilizes the term dictionary 920 to translate specified words or phrases identified in the term dictionary 920. As mentioned above, this enables a specific translation of a word or phrase to be performed regardless of the context in which the word or phrase appears. Other types of constraints can also be utilized in other configurations instead of or in addition to the term dictionary 920.

The next step in the translation workflow 904 is the translation process 922. The translation process 922 utilizes the machine translation decoder 934 to translate the input segment 924 into the target language. In this regard, the machine translation decoder 934 can utilize the dynamic background translation model 908A, the dynamic client translation model 908B, and a combined translation model, if present, to dynamically learn a model that can be utilized to translate the input segment 924 specifically to one or more candidate translations of the input segment 924 in the target language.

The translation models 908 can provide various feature scores for the candidate translations. Similarly, the machine translation decoder 934 can utilize the background language model 910A, the client language model 910B, and the cluster-based language model 910C to also generate feature scores for the candidate translations. The model weights 914 can then be utilized to weight the various contributions from the language models 910 and the translation models 908. The weighted feature scores can then be utilized to combine various candidate translations to form a translation of the input segment 924. In some implementations, the weighted feature scores can be used to identify the N-best translations of the input segment along with associated scores, etc.

As mentioned briefly above, the re-tagging process 926 can then be performed to re-apply any formatting removed from the input segment 924 by the de-tagging process 904. Subsequently, the de-tokenization process 928 can utilize the tokenization/de-tokenization model 960 to de-tokenize the translated segment 956. For example, and without limitation, the de-tokenization process 928 can attach punctuation to the translated segment 956 that was separated by the tokenization process 912. As another example, the de-tokenization process 928 can merge contractions that were broken apart by the tokenization process 912. The de-tokenization process 928 can also perform other functionality not specifically mentioned herein.

In one configuration, a stylization process 950 is also performed as a part of the translation workflow 904. The stylization process 950 utilizes pre-defined lists of client-specific rules to stylize the translated segment 956. For example, and without limitation, spaces can be inserted before measurements or a certain type of quotation marks can be utilized for a specific language. Other types of client-specific stylizations that are to be applied to the translated segment 956 can also be defined and utilized in a similar manner.

Once the translation workflow 904 has completed, the translation results can be returned in response to the request to translate the input segment 924 from the source language to the target language. For example, MT results in the form of a single translation of the input segment 924, an N-best list including multiple hypotheses and respective scores, etc., may be sent to, for example, the language output component 193 discussed above, which may be located on the same or a different server than the MT engine 196.

Figure 10:
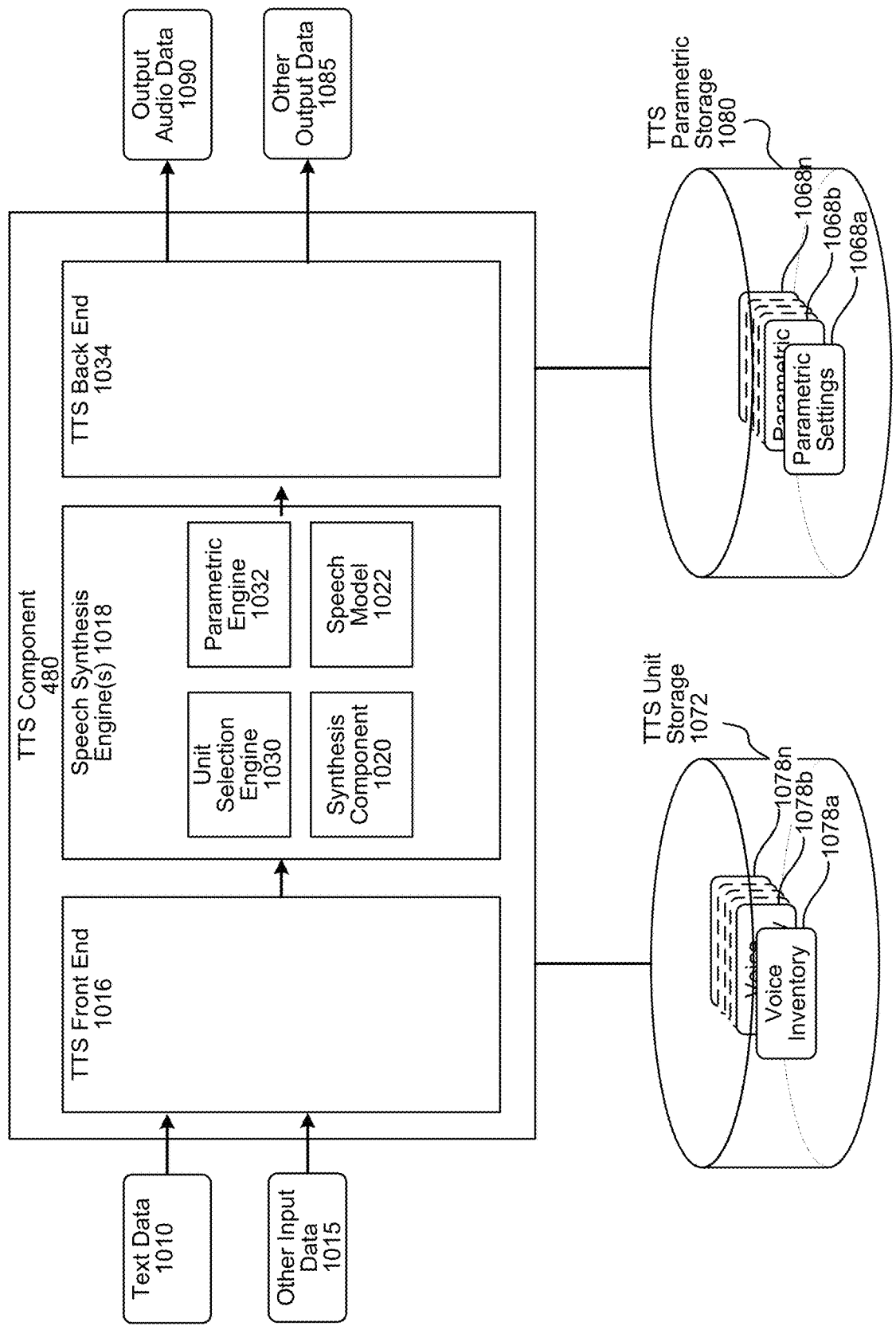
FIG. 10 is a conceptual diagram of text-to-speech components according to embodiments of the present disclosure.

Components of a system that may be used to perform unit selection, parametric TTS processing, and/or model-based audio synthesis are shown in FIG. 10. As shown in FIG. 10, the TTS component/processor 480 may include a TTS front end 1016, a speech synthesis engine 1018, TTS unit storage 1072, TTS parametric storage 1080, and a TTS back end 1034. The TTS unit storage 1072 may include, among other things, voice inventories 1078a-1078n that may include pre-recorded audio segments (called units) to be used by the unit selection engine 1030 when performing unit selection synthesis as described below. The TTS parametric storage 1080 may include, among other things, parametric settings 1068a-1068n that may be used by the parametric synthesis engine 1032 when performing parametric synthesis as described below. A particular set of parametric settings 1068 may correspond to a particular voice profile (e.g., whispered speech, excited speech, etc.).

In various embodiments of the present disclosure, model-based synthesis of audio data may be performed using by a speech model 1022 and a TTS front end 1016. The TTS front end 1016 may be the same as front ends used in traditional unit selection or parametric systems. In other embodiments, some or all of the components of the TTS front end 1016 are based on other trained models. The present disclosure is not, however, limited to any particular type of TTS front end 1016. The speech model 1022 may be used to synthesize speech without requiring the TTS unit storage 1072 or the TTS parametric storage 1080, as described in greater detail below.

TTS component receives text data 1010. Although the text data 1010 in FIG. 10 is input into the TTS component 480, it may be output by other component(s) (such as a skill 490, NLU component 460, NLG component 479 or other component) and may be intended for output by the system. Thus in certain instances text data 1010 may be referred to as "output text data." Further, the data 1010 may not necessarily be text, but may include other data (such as symbols, code, other data, etc.) that may reference text (such as an indicator of a word) that is to be synthesized. Thus data 1010 may come in a variety of forms. The TTS front end 1016 transforms the data 1010 (from, for example, an application, user, device, or other data source) into a symbolic linguistic representation, which may include linguistic context features such as phoneme data, punctuation data, syllable-level features, word-level features, and/or emotion, speaker, accent, or other features for processing by the speech synthesis engine 1018. The syllable-level features may include syllable emphasis, syllable speech rate, syllable inflection, or other such syllable-level features; the word-level features may include word emphasis, word speech rate, word inflection, or other such word-level features. The emotion features may include data corresponding to an emotion associated with the text data 1010, such as surprise, anger, or fear. The speaker features may include data corresponding to a type of speaker, such as sex, age, or profession. The accent features may include data corresponding to an accent associated with the speaker, such as Southern, Boston, English, French, or other such accent.

The TTS front end 1016 may also process other input data 1015, such as text tags or text metadata, that may indicate, for example, how specific words should be pronounced, for example by indicating the desired output speech quality in tags formatted according to the speech synthesis markup language (SSML) or in some other form. For example, a first text tag may be included with text marking the beginning of when text should be whispered (e.g., <begin whisper>) and a second tag may be included with text marking the end of when text should be whispered (e.g., <end whisper>). The tags may be included in the text data 1010 and/or the text for a TTS request may be accompanied by separate metadata indicating what text should be whispered (or have some other indicated audio characteristic). The speech synthesis engine 1018 may compare the annotated phonetic units models and information stored in the TTS unit storage 1072 and/or TTS parametric storage 1080 for converting the input text into speech. The TTS front end 1016 and speech synthesis engine 1018 may include their own controller(s)/processor(s) and memory or they may use the controller/processor and memory of the server 120, device 110, or other device, for example. Similarly, the instructions for operating the TTS front end 1016 and speech synthesis engine 1018 may be located within the TTS component 480, within the memory and/or storage of the server 120, device 110, or within an external device.

Text data 1010 input into the TTS component 480 may be sent to the TTS front end 1016 for processing. The front end 1016 may include components for performing text normalization, linguistic analysis, linguistic prosody generation, or other such components. During text normalization, the TTS front end 1016 may first process the text input and generate standard text, converting such things as numbers, abbreviations (such as Apt., St., etc.), symbols ($, %, etc.) into the equivalent of written out words.

During linguistic analysis, the TTS front end 1016 may analyze the language in the normalized text to generate a sequence of phonetic units corresponding to the input text. This process may be referred to as grapheme-to-phoneme conversion. Phonetic units include symbolic representations of sound units to be eventually combined and output by the system as speech. Various sound units may be used for dividing text for purposes of speech synthesis. The TTS component 480 may process speech based on phonemes (individual sounds), half-phonemes, di-phones (the last half of one phoneme coupled with the first half of the adjacent phoneme), bi-phones (two consecutive phonemes), syllables, words, phrases, sentences, or other units. Each word may be mapped to one or more phonetic units. Such mapping may be performed using a language dictionary stored by the system, for example in the TTS unit storage 1072. The linguistic analysis performed by the TTS front end 1016 may also identify different grammatical components such as prefixes, suffixes, phrases, punctuation, syntactic boundaries, or the like. Such grammatical components may be used by the TTS component 480 to craft a natural-sounding audio waveform output. The language dictionary may also include letter-to-sound rules and other tools that may be used to pronounce previously unidentified words or letter combinations that may be encountered by the TTS component 480. Generally, the more information included in the language dictionary, the higher quality the speech output.

Based on the linguistic analysis the TTS front end 1016 may then perform linguistic prosody generation where the phonetic units are annotated with desired prosodic characteristics, also called acoustic features, which indicate how the desired phonetic units are to be pronounced in the eventual output speech. During this stage the TTS front end 1016 may consider and incorporate any prosodic annotations that accompanied the text input to the TTS component 480. Such acoustic features may include syllable-level features, word-level features, emotion, speaker, accent, language, pitch, energy, duration, and the like. Application of acoustic features may be based on prosodic models available to the TTS component 480. Such prosodic models indicate how specific phonetic units are to be pronounced in certain circumstances. A prosodic model may consider, for example, a phoneme's position in a syllable, a syllable's position in a word, a word's position in a sentence or phrase, neighboring phonetic units, etc. As with the language dictionary, a prosodic model with more information may result in higher quality speech output than prosodic models with less information. Further, a prosodic model and/or phonetic units may be used to indicate particular speech qualities of the speech to be synthesized, where those speech qualities may match the speech qualities of input speech (for example, the phonetic units may indicate prosodic characteristics to make the ultimately synthesized speech sound like a whisper based on the input speech being whispered).

The output of the TTS front end 1016, which may be referred to as a symbolic linguistic representation, may include a sequence of phonetic units annotated with prosodic characteristics. This symbolic linguistic representation may be sent to the speech synthesis engine 1018, which may also be known as a synthesizer, for conversion into an audio waveform of speech for output to an audio output device and eventually to a user. The speech synthesis engine 1018 may be configured to convert the input text into high-quality natural-sounding speech in an efficient manner. Such high-quality speech may be configured to sound as much like a human speaker as possible, or may be configured to be understandable to a listener without attempts to mimic a precise human voice.

The speech synthesis engine 1018 may perform speech synthesis using one or more different methods. In one method of synthesis called unit selection, described further below, a unit selection engine 1030 matches the symbolic linguistic representation created by the TTS front end 1016 against a database of recorded speech, such as a database (e.g., TTS unit storage 1072) storing information regarding one or more voice corpuses (e.g., voice inventories 1078a-n). Each voice inventory may correspond to various segments of audio that was recorded by a speaking human, such as a voice actor, where the segments are stored in an individual inventory 1078 as acoustic units (e.g., phonemes, diphones, etc.). Each stored unit of audio may also be associated with an index listing various acoustic properties or other descriptive information about the unit. Each unit includes an audio waveform corresponding with a phonetic unit, such as a short.wav file of the specific sound, along with a description of various features associated with the audio waveform. For example, an index entry for a particular unit may include information such as a particular unit's pitch, energy, duration, harmonics, center frequency, where the phonetic unit appears in a word, sentence, or phrase, the neighboring phonetic units, or the like. The unit selection engine 1030 may then use the information about each unit to select units to be joined together to form the speech output.

The unit selection engine 1030 matches the symbolic linguistic representation against information about the spoken audio units in the database. The unit database may include multiple examples of phonetic units to provide the system with many different options for concatenating units into speech. Matching units which are determined to have the desired acoustic qualities to create the desired output audio are selected and concatenated together (for example by a synthesis component 1020) to form output audio data 1090 representing synthesized speech. Using all the information in the unit database, a unit selection engine 1030 may match units to the input text to select units that can form a natural sounding waveform. One benefit of unit selection is that, depending on the size of the database, a natural sounding speech output may be generated. As described above, the larger the unit database of the voice corpus, the more likely the system will be able to construct natural sounding speech.

In another method of synthesis—called parametric synthesis—parameters such as frequency, volume, noise, are varied by a parametric synthesis engine 1032, digital signal processor or other audio generation device to create an artificial speech waveform output. Parametric synthesis uses a computerized voice generator, sometimes called a vocoder. Parametric synthesis may use an acoustic model and various statistical techniques to match a symbolic linguistic representation with desired output speech parameters. Using parametric synthesis, a computing system (for example, a synthesis component 1020) can generate audio waveforms having the desired acoustic properties. Parametric synthesis may include the ability to be accurate at high processing speeds, as well as the ability to process speech without large databases associated with unit selection, but also may produce an output speech quality that may not match that of unit selection. Unit selection and parametric techniques may be performed individually or combined together and/or combined with other synthesis techniques to produce speech audio output.

The TTS component 480 may be configured to perform TTS processing in multiple languages. For each language, the TTS component 480 may include specially configured data, instructions and/or components to synthesize speech in the desired language(s). To improve performance, the TTS component 480 may revise/update the contents of the TTS unit storage 1072 based on feedback of the results of TTS processing, thus enabling the TTS component 480 to improve speech synthesis.

The TTS unit storage 1072 may be customized for an individual user based on his/her individualized desired speech output. In particular, the speech unit stored in a unit database may be taken from input audio data of the user speaking. For example, to create the customized speech output of the system, the system may be configured with multiple voice inventories 1078a-1078n, where each unit database is configured with a different "voice" to match desired speech qualities. Such voice inventories may also be linked to user accounts. The voice selected by the TTS component 480 may be used to synthesize the speech. For example, one voice corpus may be stored to be used to synthesize whispered speech (or speech approximating whispered speech), another may be stored to be used to synthesize excited speech (or speech approximating excited speech), and so on. To create the different voice corpuses a multitude of TTS training utterances may be spoken by an individual (such as a voice actor) and recorded by the system. The audio associated with the TTS training utterances may then be split into small audio segments and stored as part of a voice corpus. The individual speaking the TTS training utterances may speak in different voice qualities to create the customized voice corpuses, for example the individual may whisper the training utterances, say them in an excited voice, and so on. Thus the audio of each customized voice corpus may match the respective desired speech quality. The customized voice inventory 1078 may then be used during runtime to perform unit selection to synthesize speech having a speech quality corresponding to the input speech quality.

Additionally, parametric synthesis may be used to synthesize speech with the desired speech quality. For parametric synthesis, parametric features may be configured that match the desired speech quality. If simulated excited speech was desired, parametric features may indicate an increased speech rate and/or pitch for the resulting speech. Many other examples are possible. The desired parametric features for particular speech qualities may be stored in a "voice" profile (e.g., parametric settings 1068) and used for speech synthesis when the specific speech quality is desired. Customized voices may be created based on multiple desired speech qualities combined (for either unit selection or parametric synthesis). For example, one voice may be "shouted" while another voice may be "shouted and emphasized." Many such combinations are possible.

Unit selection speech synthesis may be performed as follows. Unit selection includes a two-step process. First a unit selection engine 1030 determines what speech units to use and then it combines them so that the particular combined units match the desired phonemes and acoustic features and create the desired speech output. Units may be selected based on a cost function which represents how well particular units fit the speech segments to be synthesized. The cost function may represent a combination of different costs representing different aspects of how well a particular speech unit may work for a particular speech segment. For example, a target cost indicates how well an individual given speech unit matches the features of a desired speech output (e.g., pitch, prosody, etc.). A join cost represents how well a particular speech unit matches an adjacent speech unit (e.g., a speech unit appearing directly before or directly after the particular speech unit) for purposes of concatenating the speech units together in the eventual synthesized speech. The overall cost function is a combination of target cost, join cost, and other costs that may be determined by the unit selection engine 1030. As part of unit selection, the unit selection engine 1030 chooses the speech unit with the lowest overall combined cost. For example, a speech unit with a very low target cost may not necessarily be selected if its join cost is high.

The system may be configured with one or more voice corpuses for unit selection. Each voice corpus may include a speech unit database. The speech unit database may be stored in TTS unit storage 1072 or in another storage component. For example, different unit selection databases may be stored in TTS unit storage 1072. Each speech unit database (e.g., voice inventory) includes recorded speech utterances with the utterances' corresponding text aligned to the utterances. A speech unit database may include many hours of recorded speech (in the form of audio waveforms, feature vectors, or other formats), which may occupy a significant amount of storage. The unit samples in the speech unit database may be classified in a variety of ways including by phonetic unit (phoneme, diphone, word, etc.), linguistic prosodic label, acoustic feature sequence, speaker identity, etc. The sample utterances may be used to create mathematical models corresponding to desired audio output for particular speech units. When matching a symbolic linguistic representation the speech synthesis engine 1018 may attempt to select a unit in the speech unit database that most closely matches the input text (including both phonetic units and prosodic annotations). Generally the larger the voice corpus/speech unit database the better the speech synthesis may be achieved by virtue of the greater number of unit samples that may be selected to form the precise desired speech output.

Vocoder-based parametric speech synthesis may be performed as follows. A TTS component 480 may include an acoustic model, or other models, which may convert a symbolic linguistic representation into a synthetic acoustic waveform of the text input based on audio signal manipulation. The acoustic model includes rules which may be used by the parametric synthesis engine 1032 to assign specific audio waveform parameters to input phonetic units and/or prosodic annotations. The rules may be used to calculate a score representing a likelihood that a particular audio output parameter(s) (such as frequency, volume, etc.) corresponds to the portion of the input symbolic linguistic representation from the TTS front end 1016.

The parametric synthesis engine 1032 may use a number of techniques to match speech to be synthesized with input phonetic units and/or prosodic annotations. One common technique is using Hidden Markov Models (HMMs). HMMs may be used to determine probabilities that audio output should match textual input. HMMs may be used to translate from parameters from the linguistic and acoustic space to the parameters to be used by a vocoder (the digital voice encoder) to artificially synthesize the desired speech. Using HMMs, a number of states are presented, in which the states together represent one or more potential acoustic parameters to be output to the vocoder and each state is associated with a model, such as a Gaussian mixture model. Transitions between states may also have an associated probability, representing a likelihood that a current state may be reached from a previous state. Sounds to be output may be represented as paths between states of the HMM and multiple paths may represent multiple possible audio matches for the same input text. Each portion of text may be represented by multiple potential states corresponding to different known pronunciations of phonemes and their parts (such as the phoneme identity, stress, accent, position, etc.). An initial determination of a probability of a potential phoneme may be associated with one state. As new text is processed by the speech synthesis engine 1018, the state may change or stay the same, based on the processing of the new text. For example, the pronunciation of a previously processed word might change based on later processed words. A Viterbi algorithm may be used to find the most likely sequence of states based on the processed text. The HMMs may generate speech in parameterized form including parameters such as fundamental frequency (f0), noise envelope, spectral envelope, etc. that are translated by a vocoder into audio segments. The output parameters may be configured for particular vocoders such as a STRAIGHT vocoder, TANDEM-STRAIGHT vocoder, WORLD vocoder, HNM (harmonic plus noise) based vocoders, CELP (code-excited linear prediction) vocoders, GlottHMM vocoders, HSM (harmonic/stochastic model) vocoders, or others.

In addition to calculating potential states for one audio waveform as a potential match to a phonetic unit, the parametric synthesis engine 1032 may also calculate potential states for other potential audio outputs (such as various ways of pronouncing a particular phoneme or diphone) as potential acoustic matches for the acoustic unit. In this manner multiple states and state transition probabilities may be calculated.

The probable states and probable state transitions calculated by the parametric synthesis engine 1032 may lead to a number of potential audio output sequences. Based on the acoustic model and other potential models, the potential audio output sequences may be scored according to a confidence level of the parametric synthesis engine 1032. The highest scoring audio output sequence, including a stream of parameters to be synthesized, may be chosen and digital signal processing may be performed by a vocoder or similar component to create an audio output including synthesized speech waveforms corresponding to the parameters of the highest scoring audio output sequence and, if the proper sequence was selected, also corresponding to the input text. The different parametric settings 1068, which may represent acoustic settings matching a particular parametric "voice", may be used by the synthesis component 1020 to ultimately create the output audio data 1090.

When performing unit selection, after a unit is selected by the unit selection engine 1030, the audio data corresponding to the unit may be passed to the synthesis component 1020. The synthesis component 1020 may then process the audio data of the unit to create modified audio data where the modified audio data reflects a desired audio quality. The synthesis component 1020 may store a variety of operations that can convert unit audio data into modified audio data where different operations may be performed based on the desired audio effect (e.g., whispering, shouting, etc.).

As an example, input text may be received along with metadata, such as SSML tags, indicating that a selected portion of the input text should be whispered when output by the TTS module 480. For each unit that corresponds to the selected portion, the synthesis component 1020 may process the audio data for that unit to create a modified unit audio data. The modified unit audio data may then be concatenated to form the output audio data 1090. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS module 480. In that case, other output data 1085 may be output along with the output audio data 1090 so that an ultimate playback device (e.g., device 110) receives instructions for playback that can assist in creating the desired output audio. Thus, the other output data 1085 may include instructions or other data indicating playback device settings (such as volume, playback rate, etc.) or other data indicating how output audio data including synthesized speech should be output. For example, for whispered speech, the output audio data 1090 may include other output data 1085 that may include a prosody tag or other indicator that instructs the device 110 to slow down the playback of the output audio data 1090, thus making the ultimate audio sound more like whispered speech, which may be slower than normal speech. In another example, the other output data 1085 may include a volume tag that instructs the device 110 to output the speech at a volume level less than a current volume setting of the device 110, thus improving the quiet whisper effect.

Various machine learning techniques may be used to train and operate models to perform various steps described herein, such as user recognition, sentiment detection, image processing, dialog management, etc. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

Figure 11:
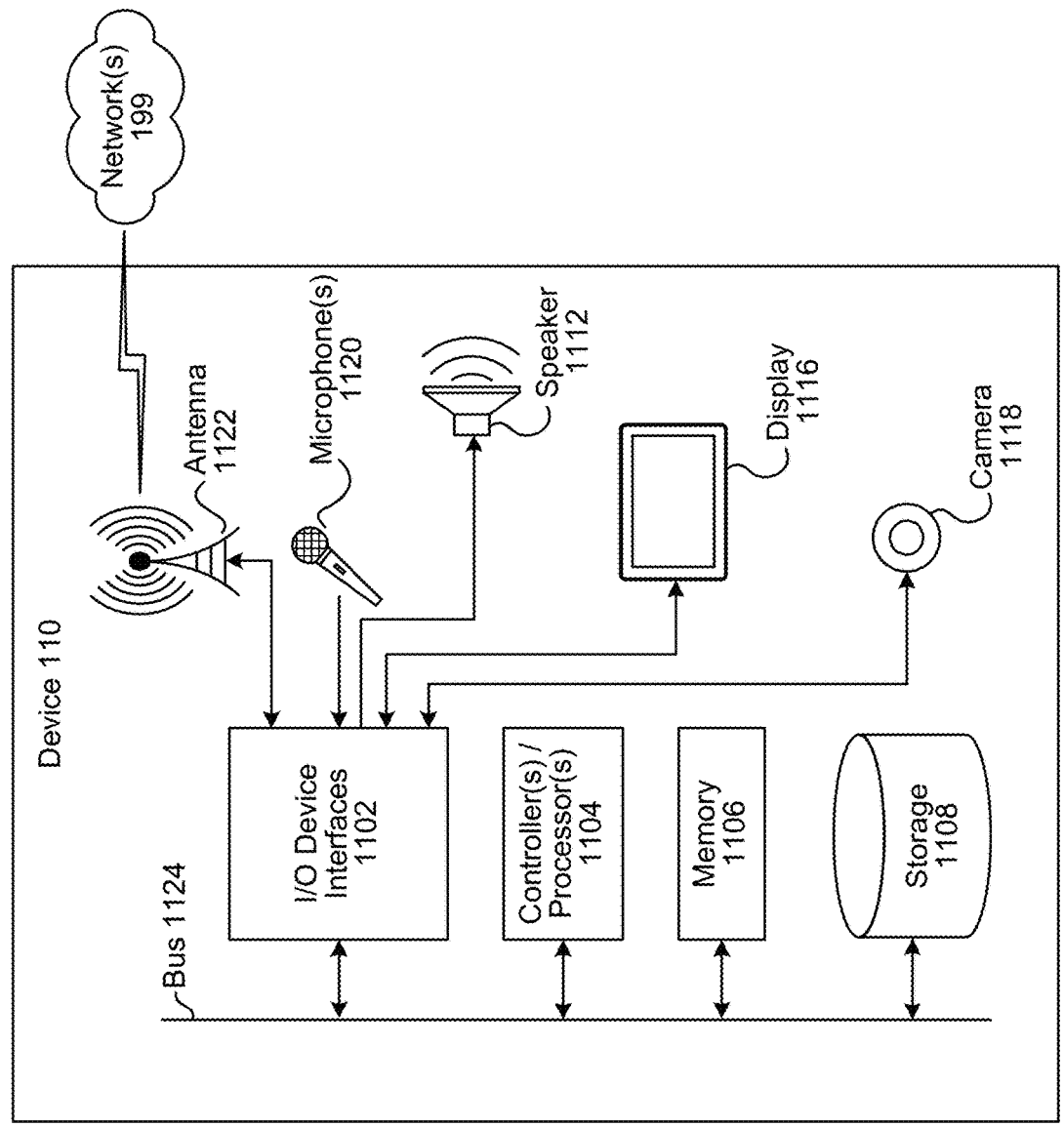
FIG. 11 is a block diagram conceptually illustrating example components of a device, according to embodiments of the present disclosure.
Figure 12:
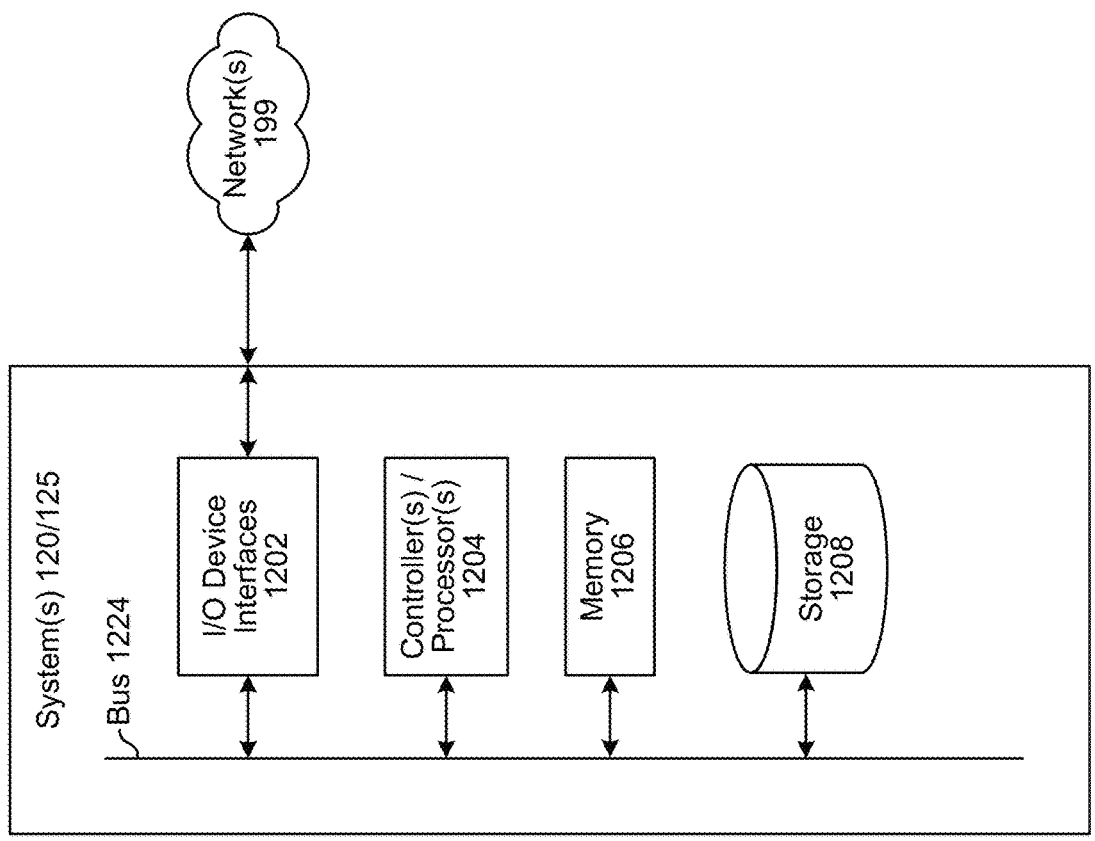
FIG. 12 is a block diagram conceptually illustrating example components of a system, according to embodiments of the present disclosure.

FIG. 11 is a block diagram conceptually illustrating a device 110 that may be used with the system. FIG. 12 is a block diagram conceptually illustrating example components of a remote device, such as the natural language processing system 120, which may assist with ASR processing, NLU processing, etc., and a skill system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the overall system 100 of the present disclosure, such as one or more natural language processing systems 120 for performing ASR processing, one or more natural language processing systems 120 for performing NLU processing, one or more skill systems 125, etc. In operation, each of these systems may include computer-readable and computer-executable instructions that reside on the respective device (120/125), as will be discussed further below.

Each of these devices (110/120/125) may include one or more controllers/processors (1104/1204), which may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive memory (MRAM), and/or other types of memory. Each device (110/120/125) may also include a data storage component (1108/1208) for storing data and controller/processor-executable instructions. Each data storage component (1108/1208) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (1102/1202).

Computer instructions for operating each device (110/120/125) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120/125) includes input/output device interfaces (1102/1202). A variety of components may be connected through the input/output device interfaces (1102/1202), as will be discussed further below. Additionally, each device (110/120/125) may include an address/data bus (1124/1224) for conveying data among components of the respective device. Each component within a device (110/120/125) may also be directly connected to other components in addition to (or instead of) being connected to other components across the bus (1124/1224).

Referring to FIG. 11, the device 110 may include input/output device interfaces 1102 that connect to a variety of components such as an audio output component such as a speaker 1112, a wired headset or a wireless headset (not illustrated), or other component capable of outputting audio. The device 110 may also include an audio capture component. The audio capture component may be, for example, a microphone 1120 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1116 for displaying content. The device 110 may further include a camera 1118.

Via antenna(s) 1122, the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1102/1202) may also include communication components that allow data to be exchanged between devices such as different physical servers in a collection of servers or other components.

The components of the device(s) 110, the natural language processing system 120, or a skill system 125 may include their own dedicated processors, memory, and/or storage. Alternatively, one or more of the components of the device(s) 110, the natural language processing system 120, or a skill system 125 may utilize the I/O interfaces (1102/1202), processor(s) (1104/1204), memory (1106/1206), and/or storage (1108/1208) of the device(s) 110, natural language processing system 120, or the skill system 125, respectively. Thus, the ASR component 450 may have its own I/O interface(s), processor(s), memory, and/or storage; the NLU component 460 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the natural language processing system 120, and a skill system 125, as described herein, are illustrative, and may be located as a stand-alone device or may be included, in whole or in part, as a component of a larger device or system.

Figure 13:
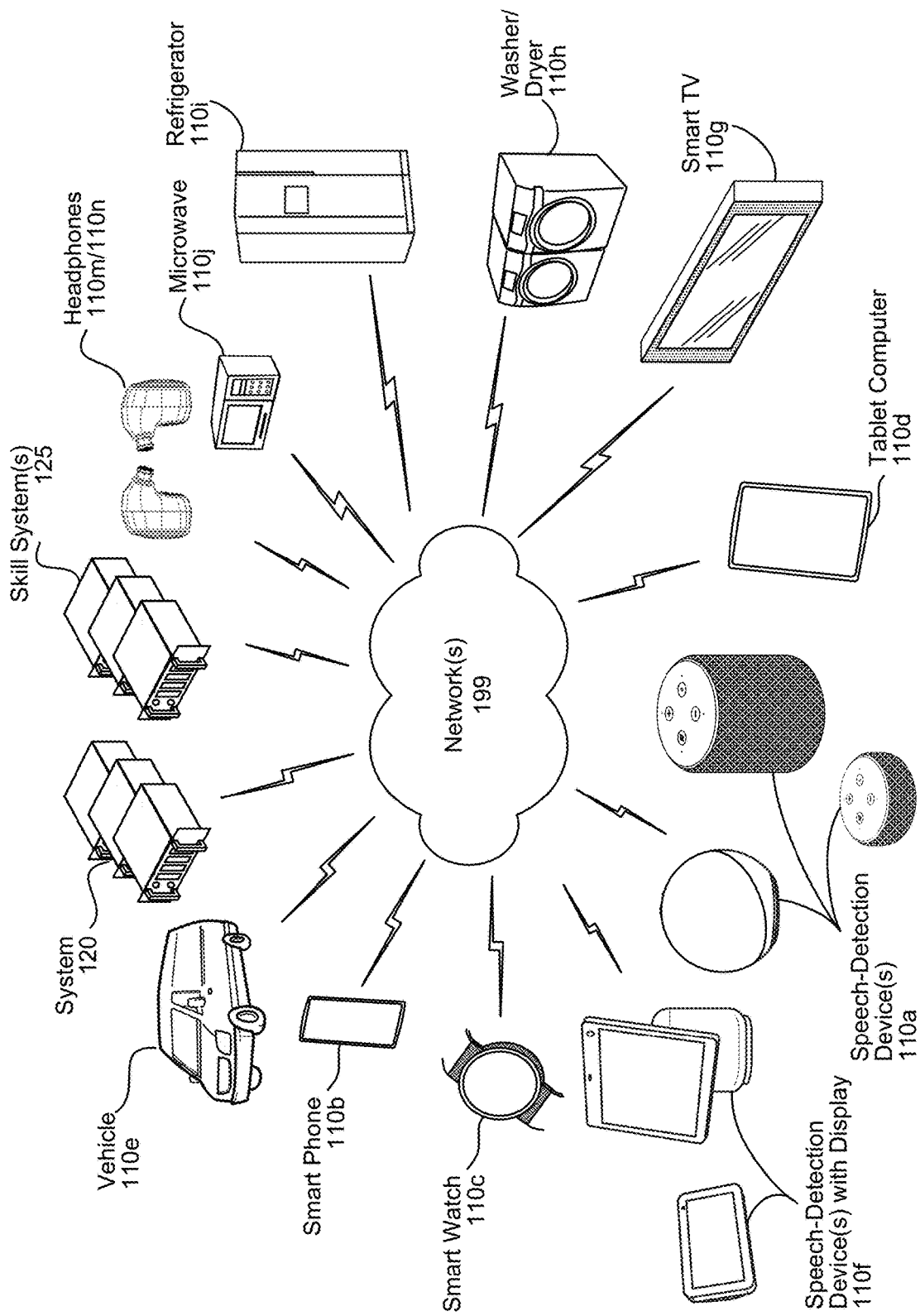
FIG. 13 illustrates an example of a computer network for use with the overall system, according to embodiments of the present disclosure.

As illustrated in FIG. 13, multiple devices (110a-110n, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a speech-detection device with display 110*f*, a display/smart television 110*g*, a washer/dryer 110*h*, a refrigerator 110*i*, and/or a microwave 110*j* may be connected to the network(s) 199 through a wireless service provider, over a WiFi or cellular network connection, or the like. Other devices are included as network-connected support devices, such as the natural language processing system 120, the skill system(s) 125, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 450, the NLU component 460, etc. of the natural language processing system 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein. Further, unless expressly stated to the contrary, features/operations/components, etc. from one embodiment discussed herein may be combined with features/operations/components, etc. from another embodiment discussed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for translating commands between speech-processing systems, the method comprising:
    receiving, by a first speech-processing system, first input audio data representing an utterance received by a voice-controlled device, the first input audio data including a representation of a first wakeword corresponding to the first speech-processing system, wherein the voice-controlled device is configured to identify audio from microphones representing the first wakeword;
    detecting, in the first input audio data, a representation of a second wakeword corresponding to a second speech-processing system, wherein the voice-controlled device is configured to identify audio from microphones representing the second wakeword;
    performing automatic speech recognition (ASR) processing on the first input audio data to generate ASR result data including first text data representing the first input audio data;
    performing natural language understanding (NLU) processing on the ASR result data to determine a request to send first output audio data to another speech-processing system for processing, wherein detection of the second wakeword indicates that the first speech-processing system is to send the first output audio data to the second speech-processing system;
    in response to determining the request, performing text-to-speech (TTS) processing based on the first text data to generate the first output audio data;
    generating, based on detecting the representation of the second wakeword, a first indication that the voice-controlled device is to send the first output audio data to the second speech-processing system; and
    sending, to the voice-controlled device, the first output audio data and the first indication.

2. The method of claim 1, wherein the utterance is in a first language and the method further comprises:
    receiving, by the first speech-processing system, metadata corresponding to the second speech-processing system;
    determining, based on the metadata, that the second speech-processing system processes commands in a second language; and
    processing, using a machine translation component, the first text data to generate second text data representing a translation of the first input audio data into the second language, wherein performing the TTS processing based on the first text data includes processing the second text data to generate the first output audio data.

3. The method of claim 1, further comprising:
receiving, by the first speech-processing system, metadata corresponding to the second speech-processing system;
determining, based on the metadata, that the first speech-processing system is configured to send data to the second speech-processing system by sending audio data to the voice-controlled device; and
in response to determining that the first speech-processing system is configured to send data to the second speech-processing system by sending audio data to the voice-controlled device:
generating the first indication, and
sending the first output audio data to the voice-controlled device.

4. The method of claim 1, wherein performing the NLU processing includes:
identifying a first command in the ASR result data, the first command representing the request;
identifying a second command in the ASR result data;
determining that the second command is associated with the second wakeword; and
determining, based on determining that the second command is associated with the second wakeword, that the second command is to be performed by the second speech-processing system.

5. A method comprising:
receiving, by a first natural language processing system, first input data representing a command received by a user device;
performing natural language processing on the first input data to determine a request to send first output audio data to a second natural language processing system;
in response to determining the request, performing text-to-speech (TTS) processing based on the first input data to generate the first output audio data; and
sending, to the user device, the first output audio data and a first indication that the first output audio data is to be sent to the second natural language processing system.

6. The method of claim 5, wherein the first input data is in a first language and the method further comprises:
receiving, by the first natural language processing system, metadata corresponding to the second natural language processing system;
determining, based on the metadata, that the second natural language processing system processes inputs in a second language; and
processing, using a machine translation component, the first input data to generate text data representing a translation of the first input data into the second language, wherein performing the TTS processing based on the first input data includes processing the text data to generate the first output audio data.

7. The method of claim 6, further comprising:
receiving, from the user device, input audio data representing an output generated by the second natural language processing system;
receiving a second indication that the input audio data is part of a dialog in the first language;
determining that the input audio data is in the second language;
in response to the second indication and determining that the input audio data is in the second language, determine that the input audio data is to be translated into a first language;
performing speech processing on the input audio data to generate first text data representing the input audio data;
processing, using a machine translation component, the first text data to generate second text data representing a translation of the input audio data into the first language;
performing TTS processing on the second text data to generate second output audio data; and
causing the user device to output synthesized speech based on the second output audio data.

8. The method of claim 5 further comprising:
receiving a profile identifier associated with the first input data;
determining, based on profile data corresponding to the profile identifier, that audio data to be sent to the second natural language processing system is to be output by the user device; and
in response to determining that audio data to be send to the second natural language processing system is to be output by the user device, causing the user device to output synthesized speech representing the first output audio data.

9. The method of claim 5, wherein the first input data is audio data representing an utterance and the method further comprises:
detecting, in the first input data, a representation of a wakeword corresponding to the second natural language processing system, wherein determining the request to send first output audio data to a second natural language processing system is based in part on detecting the representation of the wakeword.

10. The method of claim 9, wherein performing the natural language processing includes:
identifying a first command in the first input data, the first command representing the request;
identifying a second command in the first input data;
determining that the second command is associated with the wakeword; and
determining, based on determining that the second command is associated with the wakeword, that the second command is to be performed by the second natural language processing system, wherein the first output audio data represents the second command.

11. The method of claim 5, further comprising:
receiving, by the first natural language processing system, metadata corresponding to the second natural language processing system; and
determining, based on the metadata, that the first natural language processing system is not configured to send data directly to the second natural language processing system, wherein sending the first output audio data is performed in response to determining that the first natural language processing system may not share data directly with the second natural language processing system.

12. The method of claim 5, further comprising:
receiving, by the first natural language processing system, metadata corresponding to the second natural language processing system;
determining, based on the metadata, that the first natural language processing system is configured to send data to the second natural language processing system by sending audio data to the user device; and in response to determining that the first natural language processing system is configured to send data to the second natural language processing system by sending audio data to the user device:
generating the first indication, and
sending the first output audio data to the user device.

13. A first natural language processing system, comprising:
at least one processor; and
at least one memory comprising instructions that, when executed by the at least one processor, cause the first natural language processing system to:
receive first input data representing a command received by a user device;
perform natural language processing on the first input data to determine a request to send first output audio data to a second natural language processing system;
in response to determining the request, perform text-to-speech (TTS) processing based on the first input data to generate the first output audio data; and
send, to the user device, the first output audio data and a first indication that the first output audio data is to be sent to the second natural language processing system.

14. The first natural language processing system of claim 13, wherein the first input data is in a first language and wherein the at least one memory further comprises instructions that, when executed by the at least one processor, further cause the first natural language processing system to:
receive metadata corresponding to the second natural language processing system;
determine, based on the metadata, that the second natural language processing system processes inputs in a second language; and
process, using a machine translation component, the first input data to generate text data representing a translation of the first input data into the second language, wherein performing the TTS processing based on the first input data includes processing the text data to generate the first output audio data.

15. The first natural language processing system of claim 14, wherein the at least one memory further comprises instructions that, when executed by the at least one processor, further cause the first natural language processing system to:
receive, from the user device, input audio data representing an output generated by the second natural language processing system;
receive a second indication that the input audio data is part of a dialog in the first language;
determine that the input audio data is in the second language;
in response to the second indication and determination that the input audio data is in the second language, determine that the input audio data is to be translated into a first language;
perform speech processing on the input audio data to generate first text data representing the input audio data;
process, using a machine translation component, the first text data to generate second text data representing a translation of the input audio data into the first language;
perform TTS processing on the second text data to generate second output audio data; and
cause the user device to output synthesized speech based on the second output audio data.

16. The first natural language processing system of claim 13, wherein the at least one memory further comprises instructions that, when executed by the at least one processor, further cause the first natural language processing system to:
receive a profile identifier associated with the first input data;
determine, based on profile data corresponding to the profile identifier, that audio data to be sent to the second natural language processing system is to be output by the user device; and
in response to determining that audio data to be send to the second natural language processing system is to be output by the user device, cause the user device to output synthesized speech representing the first output audio data.

17. The first natural language processing system of claim 13, wherein the first input data is audio data representing an utterance and wherein the at least one memory further comprises instructions that, when executed by the at least one processor, further cause the first natural language processing system to:
detect, in the first input data, a representation of a wakeword corresponding to the second natural language processing system, wherein determining the request to send first output audio data to a second natural language processing system is based in part on detecting the representation of the wakeword.

18. The first natural language processing system of claim 17, wherein the at least one memory further comprises instructions that, when executed by the at least one processor, further cause the first natural language processing system to:
identify a first command in the first input data, the first command representing the request;
identify a second command in the first input data;
determine that the second command is associated with the wakeword; and
determine, based on determining that the second command is associated with the wakeword, that the second command is to be performed by the second natural language processing system, wherein the first output audio data represents the second command.

19. The first natural language processing system of claim 13, wherein the at least one memory further comprises instructions that, when executed by the at least one processor, further cause the first natural language processing system to:
receive metadata corresponding to the second natural language processing system; and
determine, based on the metadata, that the first natural language processing system is not configured to send data directly to the second natural language processing system, wherein sending the first output audio data is performed in response to determining that the first natural language processing system may not share data directly with the second natural language processing system.

20. The first natural language processing system of claim 13, wherein the at least one memory further comprises instructions that, when executed by the at least one processor, further cause the first natural language processing system to:
receive metadata corresponding to the second natural language processing system;

determine, based on the metadata, that the first natural language processing system is configured to send data to the second natural language processing system by sending audio data to the user device; and in response to determine that the first natural language processing system is configured to send data to the second natural language processing system by sending audio data to the user device:
generate the first indication, and
send the first output audio data to the user device.

* * * * *